(12) United States Patent
Wang et al.

(10) Patent No.: US 11,908,036 B2
(45) Date of Patent: Feb. 20, 2024

(54) REFINING IMAGE ACQUISITION DATA THROUGH DOMAIN ADAPTATION

(71) Applicant: Adobe Inc., San Jose, CA (US)

(72) Inventors: Oliver Wang, Seattle, WA (US); Jianming Zhang, Campbell, CA (US); Dingzeyu Li, Seattle, WA (US); Zekun Hao, New York, NY (US)

(73) Assignee: Adobe Inc., San Jose, CA (US)

( * ) Notice: Subject to any disclaimer, the term of this patent is extended or adjusted under 35 U.S.C. 154(b) by 155 days.

(21) Appl. No.: 17/034,467

(22) Filed: Sep. 28, 2020

(65) Prior Publication Data

US 2022/0101476 A1  Mar. 31, 2022

(51) Int. Cl.
*G06T 1/00* (2006.01)
*G06N 3/08* (2023.01)
(Continued)

(52) U.S. Cl.
CPC .............. *G06T 1/0014* (2013.01); *G06N 3/08* (2013.01); *G06T 1/0007* (2013.01); *G06T 7/11* (2017.01);
(Continued)

(58) Field of Classification Search
CPC ....... G06T 1/0014; G06T 1/0007; G06T 7/11; G06T 7/55; G06T 2207/20081; G06N 3/08; G06V 10/44
See application file for complete search history.

(56) References Cited

U.S. PATENT DOCUMENTS 11,030,772 B2 *   6/2021  Dixit .................... G06T 7/74
11,436,743 B2 *   9/2022  Guizilini .............. G01S 7/4808
(Continued)

FOREIGN PATENT DOCUMENTS

CN    111627055 A  *  9/2020

OTHER PUBLICATIONS

Zheng et al, T2Net: Synthetic-to-Realistic Translation for Solving Single-Image Depth Estimation Tasks, ECCV (Year: 2018).*

(Continued)

*Primary Examiner* — Ping Y Hsieh
*Assistant Examiner* — Xiao Liu
(74) *Attorney, Agent, or Firm* — Shook, Hardy & Bacon L.L.P.

(57) ABSTRACT

The technology described herein is directed to a cross-domain training framework that iteratively trains a domain adaptive refinement agent to refine low quality real-world image acquisition data, e.g., depth maps, when accompanied by corresponding conditional data from other modalities, such as the underlying images or video from which the image acquisition data is computed. The cross-domain training framework includes a shared cross-domain encoder and two conditional decoder branch networks, e.g., a synthetic conditional depth prediction branch network and a real conditional depth prediction branch network. The shared cross-domain encoder converts synthetic and real-world image acquisition data into synthetic and real compact feature representations, respectively. The synthetic and real conditional decoder branch networks convert the respective synthetic and real compact feature representations back to synthetic and real image acquisition data (refined versions) conditioned on data from the other modalities. The cross-domain training framework iteratively trains the domain adaptive refinement agent.

18 Claims, 16 Drawing Sheets

(51) Int. Cl.
G06T 7/11 (2017.01)
G06T 7/55 (2017.01)
G06V 10/44 (2022.01)

(52) U.S. Cl.
CPC ............ *G06T 7/55* (2017.01); *G06V 10/44* (2022.01); *G06T 2207/20081* (2013.01)

(56) References Cited

U.S. PATENT DOCUMENTS

2019/0171908 A1* 6/2019 Salavon ............... G06N 3/0472
2019/0244060 A1* 8/2019 Dundar ................. G06T 15/00

OTHER PUBLICATIONS

Konstantinos et al arXiv 1608.06019 domain separation networks (Year: 2016).*
Godard at al Unsupervised monocular depth estimation with left-right consistency, IEEE Conference on Computer Vision and Pattern Recognition (CVPR) (Year: 2017).*
He et al, Deep residual learning for image recognition., Proceedings of the IEEE conference on computer vision and pattern recognition (CVPR). pp. 770-778 (Year: 2016).*
Wang et al, Self-Supervised Pose Adaptation for Cross-Domain Image Animation, IEEE Trans. on Artificial Intelligence, vol. 1, No. 1, pp. 34-46 (Year: 2020).*
Wang et al, Video-to-Video Synthesis, arXiv:1808.06601v2 (Year: 2018).*
Chou et al, How Sampling Rate Affects Cross-domain Transfer Learning for Video Description, IEEE International Conference on Acoustics, Speech and Signal Processing (ICASSP), pp. 2651-2655 (Year: 2018).*
Kopf, J., Cohen, M. F., Lischinski, D., & Uyttendaele, M. (2007). Joint bilateral upsampling. ACM Transactions on Graphics (ToG), 26(3), 96-es.
He, K., Sun, J., & Tang, X. (Sep. 2010). Guided image filtering. In European conference on computer vision (pp. 1-14). Springer, Berlin, Heidelberg.
He, K., Sun, J., & Tang, X. (2012). Guided image filtering. IEEE transactions on pattern analysis and machine intelligence, 35(6), 1397-1409.
Barron, J. T., & Poole, B. (Jun. 2016). The Fast Bilateral Solver. arXiv preprint arXiv:1511.03296v2.
Li, Y., Huang, J. B., Ahuja, N., & Yang, M. H. (2019). Joint image filtering with deep convolutional networks. IEEE transactions on pattern analysis and machine intelligence, 41(8), 1909-1923.
Godard, C., et al., "Unsupervised Monocular Depth Estimation with Left-Right Consistency", Proceedings of the EEE Conference on Computer Vision and Pattern Recognition (CVPR), pp. 270-279 (2017).
Long, J., et al., "Fully Convolutional Networks for Semantic Segmentation", arXiv:1411.4038v2, pp. 1-10 (Mar. 8, 2015).

* cited by examiner

REFINING IMAGE ACQUISITION DATA THROUGH DOMAIN ADAPTATION

TECHNICAL FIELD

Aspects of the disclosure are related to the field of machine learning and artificial intelligence, and in particular, to refinement of image acquisition data by domain adaptation. More specifically, the aspects of the disclosure are related to using synthetic and real domain adaptation to train a neural network-based refinement agent to improve refinement of image acquisition data, e.g., low resolution depth maps, optical flows, normal maps, segmentation maps, etc., when the image acquisition data is accompanied by a corresponding high resolution image.

BACKGROUND

Computer vision is an interdisciplinary scientific field that explores how computers gain high-level understanding from digital images or videos. Indeed, computer vision seeks to understand and automate tasks that are normally performed by humans (or human visual systems). Computer vision tasks can include methods for acquiring, processing, analyzing and understanding digital images, and extraction of high-dimensional data from the real world in order to produce numerical or symbolic information, e.g., in the forms of decisions. In this context understanding the digital images refers to the transformation of visual images (the input of the retina) into descriptions of the world that make sense to thought processes and can elicit appropriate action. More specifically, this image understanding can be seen as the disentangling of symbolic information from image data using models constructed with the aid of geometry, physics, statistics, and learning theory.

The organization of a computer vision system is highly application dependent. For example, some systems are stand-alone applications that solve a specific measurement or detection problem, while others constitute a sub-system of a larger design which, for example, also contains sub-systems for control of mechanical actuators, planning, information databases, man-machine interfaces, etc. The specific implementation of a computer vision system also depends on whether its functionality is pre-specified or if some part of it can be learned or modified during operation. Many functions are unique to the application. There are, however, typical functions that are found in many computer vision systems.

One fundamental problem in computer vision is that depth estimation from a single image can be very difficult to achieve. That is, due to restrictions around depth acquisition hardware, e.g., iPhone stereo cameras, time of flight cameras, etc., and the quality of single image depth prediction methods, the computed depths from real visual data is commonly of much lower quality than the image from which the computed depths are determined. Indeed, the computed depths are often inaccurate, low resolution and noisy. In some instances, a guided upsampling (or joint depth refinement) process can be utilized to improve the quality of the computed depths.

Various techniques have been designed to perform guided upsampling (or joint depth refinement). For example, joint bilateral upsampling techniques utilize bilateral filters to smooth computed depths and deep learning-based depth upsampling techniques utilize convolutional neural networks conditioned on RGB images to directly compute refined depths. Unfortunately, these current joint depth refinement techniques do not work well enough for real world applications. Indeed, joint bilateral upsampling techniques are limited as processing ceases at the image edges resulting in poor overall performance. Similarly, training learning networks to adequately perform guided upsampling (or joint depth refinement) has also proven challenging due to the inability to acquire appropriate training data, e.g., high-quality depth maps from real world scenes.

SUMMARY

One or more embodiments described herein, among other benefits, solve one or more of the foregoing or other problems in the art by providing systems, methods, and non-transitory computer readable media for refinement of image acquisition data though domain adaptation. In some implementations, the technology described includes a cross domain supervised learning-based system for iteratively training a domain adaptive refinement agent. The system includes a cross-domain encoder, a synthetic conditional depth decoder branch network, a real conditional depth prediction branch network, and a training supervision element. The cross-domain encoder is configured to convert synthetic and real image acquisition data into compact synthetic and real feature representations respectively. The synthetic conditional depth prediction branch network includes a synthetic encoder and a synthetic decoder. The synthetic encoder is configured to convert conditional synthetic image data associated with the synthetic image acquisition data into a conditional synthetic depth feature. The synthetic decoder is configured to convert the compact synthetic feature representation to a refined version of the synthetic image acquisition data conditioned on the conditional synthetic depth feature. The real conditional depth prediction branch network includes a real encoder and a real decoder. The real encoder is configured to convert conditional real image data associated with the real image acquisition data into a conditional real depth feature. The real decoder configured to convert the compact real feature representation to a refined version of the real image acquisition data conditioned on the conditional real depth feature. The training supervision element configured to iteratively train the domain adaptive refinement agent based on the refined versions synthetic and real image acquisition data.

In some implementations, the technology described includes a method of refining image acquisition data through domain adaptation. The method includes converting, by a cross-domain depth encoder, real image acquisition data into a compact real feature representation, converting, by a real encoder, conditional real data associated with the real image acquisition data into a conditional real depth feature, and concatenating, by a real concatenation element, the compact real feature representation and the conditional real depth feature resulting in a concatenated feature vector. The method further includes transferring the real image acquisition data to a synthetic domain by feeding the concatenated feature vector to a synthetic decoder, and converting, by the synthetic decoder, the compact real feature representation to a refined version of real image acquisition data conditioned on the conditional real depth feature.

In some implementations, the technology described includes a supervised learning-based method of iteratively training a domain adaptive refinement agent. The method includes feeding synthetic image acquisition data and real image acquisition data to a cross-domain depth encoder to convert the synthetic image acquisition data and the real image acquisition data to a compact synthetic feature representation and a compact real feature representation, respectively. The method further includes feeding the compact synthetic feature representation and conditional synthetic image data to a synthetic conditional depth prediction branch network to generate a refined version of the synthetic image acquisition data conditioned on the conditional synthetic image data. The method further includes feeding the compact real feature representation and conditional real image data to a real conditional depth prediction branch network to generate a refined version of the real image acquisition data conditioned on the conditional real image data. The method further includes comparing the refined version of the synthetic image acquisition data to ground truth synthetic image acquisition data to calculate a synthetic domain loss and the refined version of the real image acquisition data to the real image acquisition data to calculate a real domain loss, and updating network parameters of the cross-domain depth encoder and the synthetic conditional depth prediction branch network based on the synthetic domain loss and network parameters of the cross-domain depth encoder and the real conditional depth prediction branch network based on the real domain loss to iteratively train the domain adaptive refinement agent.

Additional features and advantages of the present application will be set forth in the description which follows, and in part will be obvious from the description, or may be learned by the practice of such example embodiments.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not considered to be limiting of its scope. Implementations will be described and explained with additional specificity and detail through the use of the accompanying drawings.

Figure 1A:
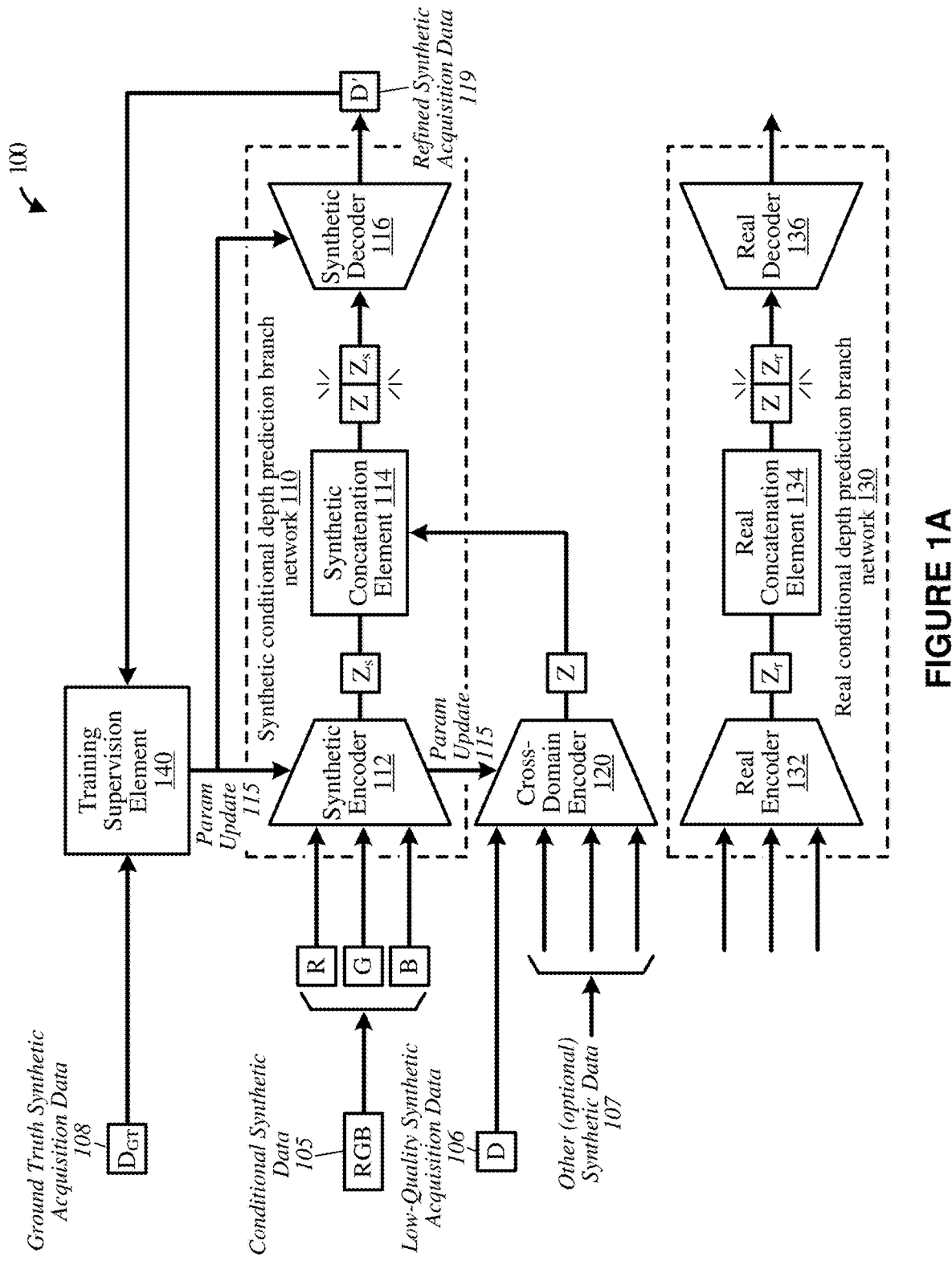
FIGS. 1A and 1B depict a block diagram illustrating an example cross-domain training framework for training a neural network-based domain adaptive refinement agent with synthetic and real data, respectively, according to some implementations.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may include machine-implemented methods, computing devices, or computer readable medium.

As noted above, directly training networks to perform guided upsampling (or joint depth refinement) techniques is challenging, at least in part, because it is difficult to acquire high-quality depth maps from real world scenes. An alternative approach is to train guided upsampling (or joint depth refinement) networks with synthetic data where perfect depth maps exist. Unfortunately, this approach also suffers deficiencies as depth prediction is a high-level task and there is a significant domain gap between real world and synthetic images resulting in poorly trained guided upsampling (or joint depth refinement) models.

The technology described herein is directed to a cross-domain training framework that iteratively trains a domain adaptive refinement agent to refine low quality real-world image acquisition data, e.g., depth maps, when accompanied by corresponding conditional data from other modalities, such as the underlying images or video from which the image acquisition data is computed. The cross-domain training framework includes a shared cross-domain encoder and two conditional decoder branch networks, e.g., a synthetic conditional depth prediction branch network and a real conditional depth prediction branch network. The shared cross-domain encoder converts synthetic and real-world image acquisition data into synthetic and real compact feature representations, respectively. The synthetic and real conditional decoder branch networks convert the respective synthetic and real compact feature representations back to synthetic and real image acquisition data (refined versions) conditioned on data from the other modalities. The cross-domain training framework iteratively trains the domain adaptive refinement agent with synthetic and real supervision.

In some implementations, to train the domain adaptive refinement agent with synthetic and real supervision, the cross-domain training framework places a loss on the difference between the outputs of the synthetic and real conditional decoder branch networks, e.g., the refined synthetic and real image acquisition data conditioned on data from the other modalities, and the corresponding synthetic and real image acquisition data inputs. More specifically, in the synthetic domain, the cross-domain training framework computes a loss on the difference between the output of the synthetic decoder branch network and the perfect ground truth synthetic acquisition data, e.g., the perfect depth map. Similarly, in the real domain, the cross-domain training framework computes a loss on the difference between the output of the real decoder branch network and the low-quality real image acquisition data input. As discussed herein, in some implementations, the loss can be an L2 loss. Once the loss is computed, a normal parameter update of the full neural network (the shared cross-domain encoder and the synthetic conditional depth prediction branch network for the synthetic case and the shared cross-domain encoder and the real conditional depth prediction branch network for the real case).

In some implementations, each conditional decoder branch network includes a conditional encoder and a conditional decoder connected by skip links that facilitate the flow of low-level conditional image information (edges, boundary details, etc.). To alleviate boundary artifacts during the reconstruction process, however, skip links are not utilized to connect the shared cross-domain encoder with the conditional decoders. In this manner, the cross-domain training framework is able to use the synthetic and real compact feature representations as guidance to refine synthetic and real-world image acquisition data based on the corresponding low-level image level features.

In some implementations, the cross-domain encoder converts synthetic and real image acquisition data to compact feature representations which are fed to the respective synthetic or real conditional decoder branch networks. The synthetic and real conditional decoder branch networks also receive and convert data from other modalities, such as the underlying images or video from which the image acquisition data is computed, into conditional depth features. The conditional decoder branch networks concatenate the conditional depth features with the corresponding compact feature representations and then convert the feature representations back to (refined) image acquisition data conditioned on the data from other modalities, such as the underlying images or video from which the image acquisition data is computed. As discussed herein, limiting the size of the feature representation encourages the cross-domain encoder to extract abstract information from the acquisition data and ignore noise. Furthermore, limiting the size of the feature representation also forces the conditional decoder branch networks to utilize conditional information extracted from the underlying image from which the depth maps were computed in order to faithfully reconstruct the depth map. Sharing the cross-domain depth encoder between the real data and synthetic data domains, together with limiting feature size, encourages the encoder to learn a joint feature encoding of two domains and distill the similarities between the two domains.

In some implementations, the cross-domain training framework trains the domain adaptive refinement agent to refine depth maps through domain adaptation. Indeed, once trained, the domain adaptive refinement agent can transfer the real-world acquisition data into a synthetic domain where edges are well aligned with accompanying condition data, e.g., image(s). As discussed herein, the approach is able to generate high quality refined acquisition data, e.g., depth maps, without paired training data for the real and synthetic domains.

Various technical effects are enabled by the techniques discussed herein. For example, the cross-domain training framework discussed herein simplifies the training process of the domain adaptive refinement agent while simultaneously improving the quality of the image acquisition data that the agent generates (or refines) as compared to prior art systems through synthetic and real domain adaptation. Indeed, among other benefits, the agent training process is simplified as the cross-domain training framework does not require paired training data for real or synthetic domains to train the neural network-based domain adaptive refinement agent to generate the high quality (or refined) image acquisition data.

As used herein, the term "domain adaption" refers to the process of transferring (or translating) real-world domain acquisition data into synthetic domain acquisition data where the edges are well aligned with the corresponding input image, e.g., the image from which the real-world image acquisition data is computed. For example, real-world domain depth maps can be adapted into synthetic domain depth maps where edges are well aligned with images.

As used herein, the term "depth map" refers to an image or image channel that contains information relating to the distance of the surfaces of scene objects from a viewpoint. The term is related to and may be analogous to depth buffer, Z-buffer, Z-buffering and Z-depth. The "Z" in these latter terms relates to a convention that the central axis of view of a camera is in the direction of the camera's Z axis, and not to the absolute Z axis of a scene.

As used herein, the term "neural network" (or artificial neural network) refers to a machine-learning model that can be tuned (e.g., trained) to approximate unknown functions. In particular, the term "neural network" can include a model of interconnected digital neurons that communicate and learn to approximate complex functions and generate outputs based on a plurality of inputs provided to the model. For instance, the term "neural network" includes one or more machine learning algorithms. In other words, a neural network is an algorithm that implements learning techniques, i.e., machine learning that utilizes a set of algorithms to attempt to model high-level abstractions in data.

Similarly, the term "deep neural network" refers to an artificial neural network with multiple layers between the input and output layers. A deep neural network finds the correct mathematical manipulation to turn the input into the output, whether it be a linear relationship or a non-linear relationship. The network moves through the layers calculating the probability of each output. Each mathematical manipulation as such is considered a layer, and complex deep neural networks can have many layers.

The cross-domain training framework and associated techniques described herein are primarily discussed with reference to training a domain adaptive refinement agent to refine low resolution, and possibly noisy and incorrect depth maps that are accompanied by high resolution RGB images. However, it is appreciated that the cross-domain training framework and associated techniques are applicable to any other domain where the extra information is edge aligned with input images, e.g., optical flow, normal maps, segmentation maps, etc.

Figure 1B:
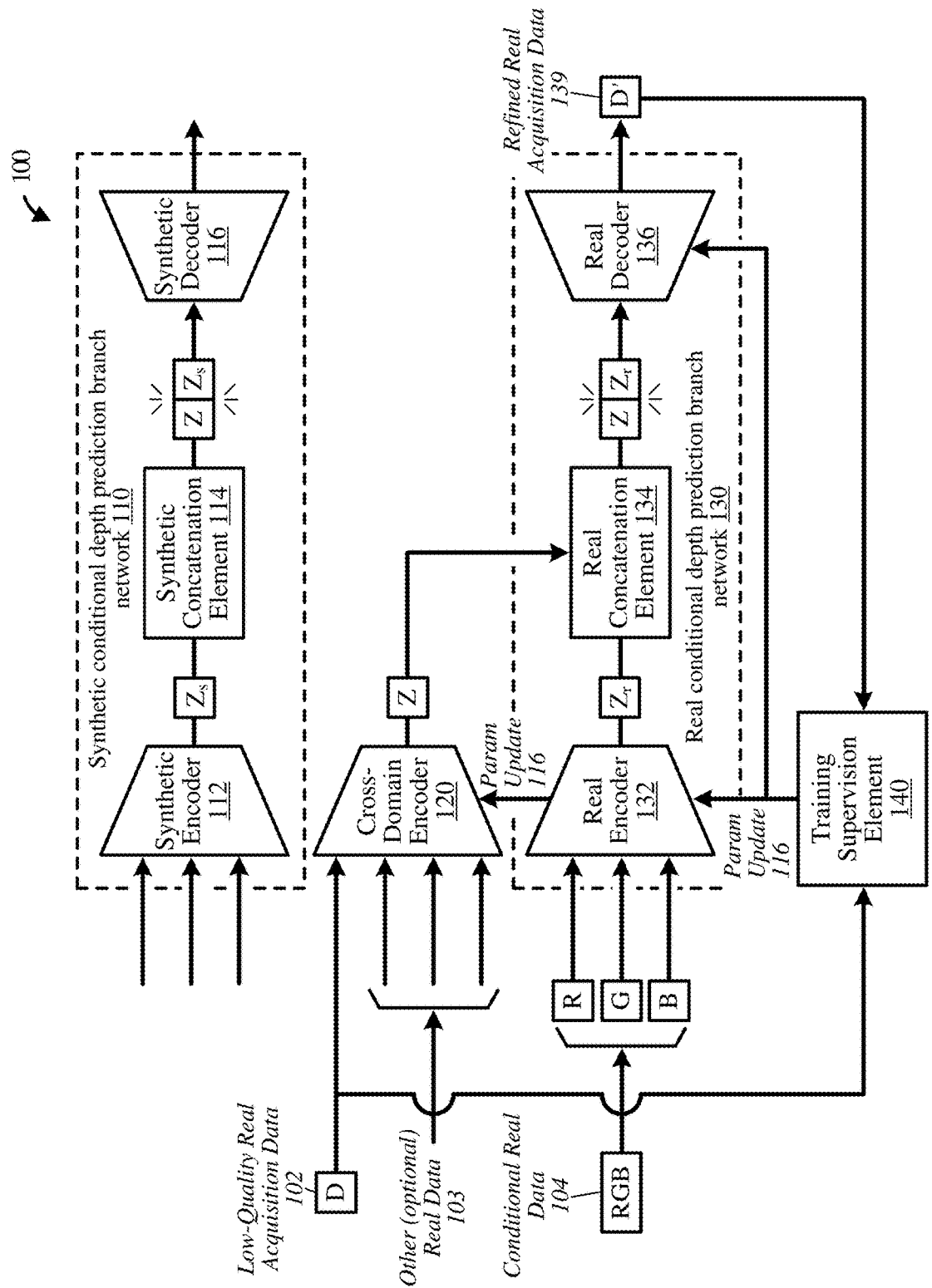
Figure 1C:
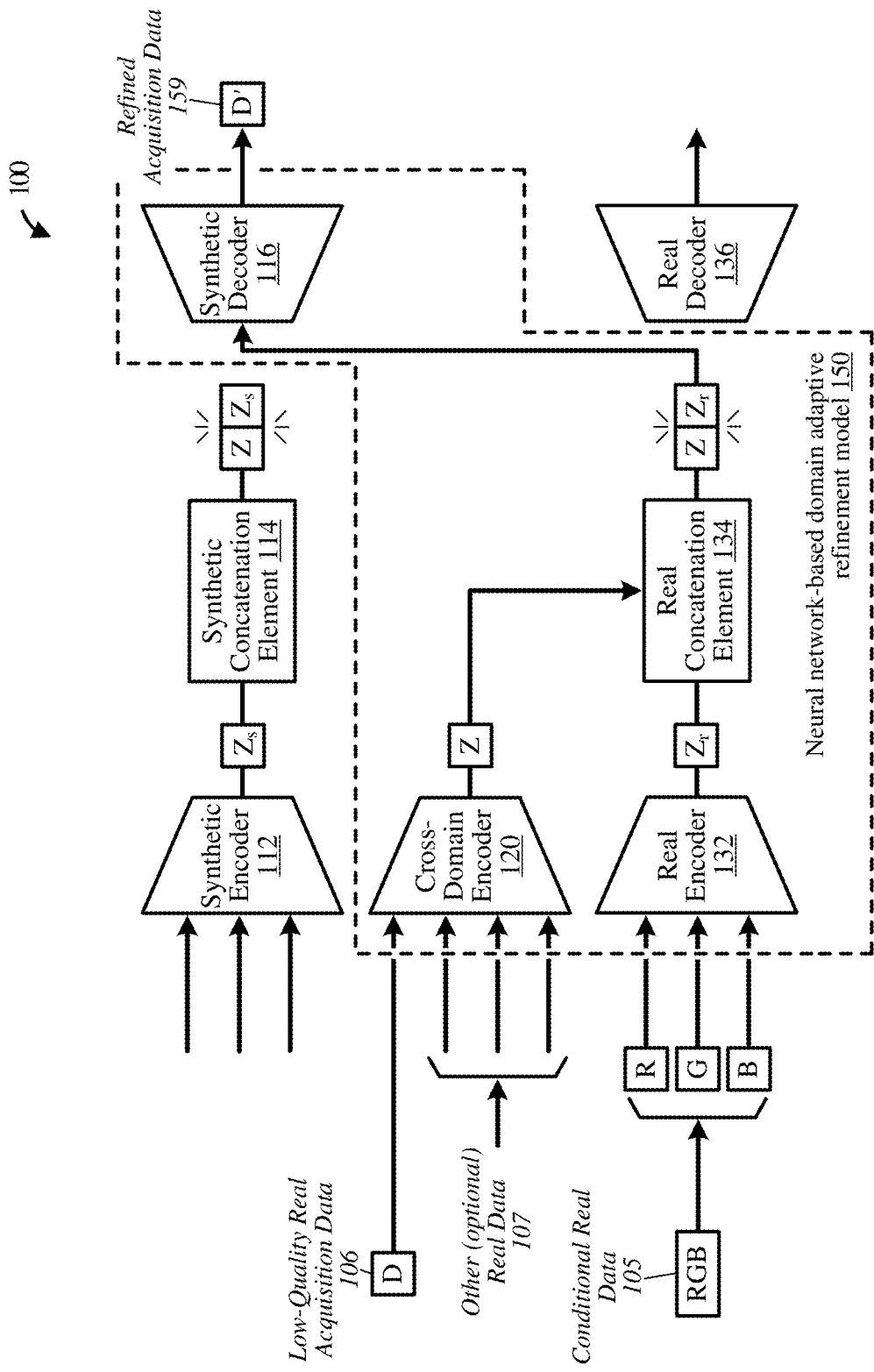
FIG. 1C depicts the example components of the cross-domain training framework that collectively form the neural network-based domain adaptive refinement model, according to some implementations.

A general overview and architecture of an example cross-domain training framework 100 for training a neural network-based domain adaptive refinement agent with synthetic data and real-world data is described in relation to FIGS. 1A and 1B, respectively. FIG. 1C depicts the example components of the cross-domain training framework 100 that constitute the neural network-based domain adaptive refinement agent. A more detailed example of operation of the trained neural network-based domain adaptive refinement agent during operation (or test time) is described in relation to FIG. 2. Thereafter, a more detailed description of the example components and processes of the cross-domain training framework are provided in relation to the subsequent figures.

Although not shown in the example of FIGS. 1A-1C, the domain adaptive refinement agent can be part of or included as a component of a computer vision system. As noted above, one common problem in computer vision is depth estimation from a single input image.

FIG. 1A depicts a block diagram illustrating an example cross-domain training framework 100 for training a neural network-based domain adaptive refinement agent with synthetic data, according to some implementations. More specifically, the cross-domain training framework 100 is operable to train a domain adaptive refinement agent for refining image acquisition data. As discussed above, the components of the neural network-based domain adaptive refinement agent in the context of the cross-domain training framework 100 are shown and discussed in greater detail with reference to FIG. 1C.

As shown in the examples of FIGS. 1A-1C, the cross-domain training framework 100 is operable to train the domain adaptive refinement agent to refine low resolution depth maps when accompanied by the corresponding high-resolution images. However, it is appreciated that the cross-domain training framework 100 is also operable to train the domain adaptive refinement agent to refine other image acquisition data such as, for example, optical flows, normal maps, segmentation maps, etc., when accompanied by corresponding high resolution images.

Referring first to FIG. 1A, the cross-domain training framework 100 is a two-branch network with two guided decoder branches (one for synthetic data and one for real data) and one shared guided encoder. More specifically, the cross-domain training framework 100 includes conditional synthetic data 105, low-quality (or imperfect) synthetic acquisition data 106, other (optional) synthetic data 107, ground truth synthetic acquisition data 108, a synthetic conditional depth prediction branch network 110, a cross-domain encoder 120, a real conditional depth decoder branch network 130, and a training supervision element 140. The synthetic conditional depth prediction branch network 110 includes a synthetic encoder 112, a synthetic concatenation element 114, and a synthetic decoder 116. The real conditional depth prediction branch network 130 includes a real encoder 132, a real concatenation element 134, and a real decoder 136. Other components or modules are also possible.

The domain adaptive refinement agent is initially trained with synthetic and real data. As shown in FIG. 1A, during synthetic data training, conditional synthetic data 105, low-quality synthetic acquisition data 106, other (optional) synthetic data 107, and ground truth synthetic acquisition data 108 are fed to the cross-domain training framework 100. Although not shown in the example of FIG. 1A, in some implementations, the cross-domain training framework 100 can generate or create the low-quality synthetic acquisition data 106 by down sampling and/or blurring the ground truth synthetic acquisition data 108. Alternatively, or additionally, the low-quality synthetic acquisition data 106 can be generated externally and fed to the cross-domain training framework 100 along with the ground truth synthetic acquisition data 108.

Continuing with the example of FIG. 1A, the conditional synthetic data 105 comprises a red-green-blue (RGB) image with red (R), green (G), and blue (B) channels that roughly follow the color receptors in the human eye and are used in computer displays and image scanners. For example, if an RGB image is 24-bit, each channel has 8 bits, for red, green, and blue. In other words, the image is composed of three images (one for each channel), where each image can store discrete pixels with conventional brightness intensities between 0 and 255. While the conditional synthetic data 105 is shown as an RGB image in the example of FIG. 1A, it is appreciated that the conditional synthetic data 105 can take other forms.

The ground truth synthetic acquisition data 108 comprises a ground truth (or perfect) depth map $D_{GT}$ corresponding to the RGB image. Similarly, the low-quality synthetic acquisition data 106 comprises a low-quality (or inaccurate) depth map D. As discussed herein, the low-quality (or inaccurate) depth map D can be generated or created by down sampling and/or blurring the ground truth (or perfect) depth map $D_{GT}$. As discussed in greater detail below, the ground truth synthetic acquisition data 108 is fed to the training supervision element 140 for training the synthetic conditional depth decoder branch 110. While the low-quality synthetic acquisition data 106 and the ground truth synthetic acquisition data 108 comprise depth maps in the example of FIG. 1A, it is appreciated that the acquisition data can take other forms such as, for example, optical flows, normal maps, segmentation maps, etc.

The cross-domain training framework 100 provides the conditional synthetic data 105 to the synthetic conditional depth prediction branch network 110 and the corresponding low-quality synthetic acquisition data 106 to the cross-domain encoder 120. The synthetic conditional depth prediction branch network 110 receives the conditional synthetic data 105 and feeds the conditional synthetic data 105 to the synthetic encoder 112. The synthetic encoder 112 encodes the conditional synthetic data 105 into a compact synthetic conditional depth feature representation ($Z_s$). As shown in the example of FIG. 1A, the synthetic encoder 112 includes image channels for R, G, and B. The compact synthetic conditional depth feature representation ($Z_s$) is fed to the synthetic concatenation element 114.

The cross-domain encoder 120 includes an input channel for receiving and encoding acquisition data. More specifically, as shown in the example of FIG. 1A, the cross-domain encoder 120 includes an input channel for receiving and encoding the low-quality synthetic acquisition data 106. As noted above, the low-quality synthetic acquisition image data 106 is a depth (or disparity) map (D). The depth map (D) is fed to the cross-domain encoder 120 which, in turn, encodes the depth map (D) into a compact synthetic feature representation (Z). The cross-domain encoder 120 can also include additional optional input channels to improve performance of the encoder. For example, the other (optional) synthetic data 107 can be fed to the cross-domain encoder 120 to improve performance.

In some implementations, the other (optional) synthetic data 107 includes the conditional synthetic data 105. For example, the other (optional) synthetic data 107 can comprise the RGB image corresponding to the depth map (D). In such instances, the RGB image is fed to corresponding R, G, and B image channels of the cross-domain encoder 120. In some implementations, the other (optional) synthetic data 107 includes RGB images from adjacent frames of the RGB image corresponding to the depth map (D) or depth maps of the adjacent frames themselves.

As shown in the example of FIG. 1A, the cross-domain encoder 120 has four input channels, three for image (R, G and B channels of the image) and one for depth (e.g., disparity map). In some implementations, the cross-domain encoder 120 comprises a neural network that has four down sample steps so the compact synthetic feature representation (Z) is 1/16 the size of the input on every spatial dimension. The compact synthetic feature representation (Z) also has four channels. In some implementations, the parameters of the network are selected through trial-and-error. In some implementations, LeakyRelu is used as activation functions between every convolutional layer. Batch normalization is not used. The compact feature representation (Z) is then fed to the synthetic concatenation element 114.

The synthetic concatenation element 114 concatenates the compact synthetic depth feature representation ($Z_s$) and the compact feature representation (Z) and provides the concatenated feature representation {$Z_s$, Z} to the synthetic decoder 116. The synthetic decoder 116 converts the compact synthetic feature representation (Z) to a refined synthetic acquisition data 119 that is conditioned on the compact synthetic depth features, e.g., the compact synthetic depth feature representation ($Z_s$). More specifically, the synthetic decoder 116 is trained to convert the concatenated feature representation {$Z_s$, Z} back to an improved (or refined) version of the low-quality synthetic acquisition image data 106. The refined synthetic acquisition data 119 is then fed to the training supervision element 140 for performing supervised training.

As shown in the example of FIG. 1A, the synthetic decoder 116 converts the compact feature representation (Z) of the low-quality (or inaccurate) depth map D to a refined depth map D' conditioned on the compact synthetic depth feature representation ($Z_s$) of the input RGB image. The refined depth map D' is then fed to the training supervision element 140.

The training supervision element 140 is configured to train the synthetic conditional depth prediction branch network 110 and the cross-domain encoder 120 using direct supervised learning. In some implementations, the training supervision element 140 determines a loss by comparing the refined synthetic acquisition data 119 and the ground truth synthetic acquisition data 108 corresponding to the low-quality synthetic acquisition data 106. For example, a loss can be placed on the difference between the ground truth synthetic acquisition data 108 and the refined synthetic acquisition data 119. The training supervision element 140 then determines and updates parameters 115 of the synthetic conditional depth prediction branch network 110 and the cross-domain encoder 120 based on the loss. For example, training supervision element 140 computes a parameter update 115 of the elements of the synthetic conditional depth prediction branch network 110 (e.g., the synthetic encoder 112, the synthetic concatenation element 114, and synthetic decoder 116) and the cross-domain encoder 120 by applying backpropagation of the gradient of the parameters with respect to the loss.

The example of FIG. 1B is similar to the example of FIG. 1A except that FIG. 1B depicts a block diagram illustrating the example cross-domain training framework 100 for training the neural network-based domain adaptive refinement agent with real data rather than synthetic data. Indeed, FIG. 1B depicts a block diagram illustrating the example cross-domain training framework 100 for training a neural network-based domain adaptive refinement agent with real data, according to some implementations. In addition to the components of the cross-domain training framework 100 of FIG. 1A, the cross-domain training framework 100 of FIG. 1B includes low-quality (or imperfect) real acquisition data 102, other (optional) real data 103, and conditional real data 104. Other components or modules are also possible.

As shown in FIG. 1B, during real data training, the low-quality (or imperfect) real acquisition data 102, the other (optional) real data 103, and the conditional real data 104 are fed to the cross-domain training framework 100 for training the neural network-based domain adaptive refinement agent. As discussed herein, real data has no ground truths. Continuing with the example of FIG. 1B, the conditional real data 104 comprises an RGB image with red (R), green (G), and blue (B) channels.

The low-quality real acquisition data 102 comprises a low-quality (or inaccurate) depth map D. As discussed herein, while the low-quality real acquisition data 102 comprises a depth map in the example of FIG. 1B, it is appreciated that the acquisition data can take other forms such as, for example, optical flows, normal maps, segmentation maps, etc.

The cross-domain training framework 100 provides the conditional real data 104 to the real conditional depth prediction branch network 130 and the corresponding low-quality real acquisition data 102 to the cross-domain encoder 120. The real conditional depth prediction branch network 130 receives the conditional real data 104 and feeds the conditional real data 104 to the real encoder 132. The real encoder 132 encodes the conditional real data 104 into a compact real conditional depth feature representation ($Z_r$). As shown in the example of FIG. 1B, the real encoder 132 includes image channels for R, G, and B. The compact real conditional depth feature representation ($Z_r$) is fed to the real concatenation element 134.

The cross-domain encoder 120 includes an input channel for receiving and encoding acquisition data. More specifically, as shown in the example of FIG. 1B, the cross-domain encoder 120 includes an input channel for receiving and encoding the low-quality real acquisition data 102. As noted above, the low-quality real acquisition image data 102 is a depth (or disparity) map (D). The depth map (D) is fed to the cross-domain encoder 120 which, in turn, encodes the depth map (D) into a compact feature representation (Z). The cross-domain encoder 120 can also include additional optional input channels to improve performance of the encoder. For example, the other (optional) real data 103 can be fed to the cross-domain encoder 120 to improve performance.

In some implementations, the other (optional) real data 103 includes the conditional real data 104. For example, the other (optional) real data 103 can comprise the RGB image corresponding to the depth map (D). In such instances, the RGB image is fed to corresponding R, G, and B image channels of the cross-domain encoder 120. In some implementations, the other (optional) real data 103 includes RGB images from adjacent frames of the RGB image corresponding to the depth map (D) or depth maps of the adjacent frames themselves.

As shown in the example of FIG. 1B, the cross-domain encoder 120 has four input channels, three for image (R, G and B channels of the image) and one for depth (e.g., disparity map). In some implementations, the cross-domain encoder 120 comprises a neural network that has four down sample steps so the compact feature representation (Z) is $\frac{1}{16}$ the size of the input on every spatial dimension. The compact feature representation (Z) also has four channels. In some implementations, the parameters of the network are selected through trial-and-error. In some implementations, LeakyRelu is used as activation functions between every convolutional layer. Batch normalization is not used. The compact feature representation (Z) is then fed to the real concatenation element 134.

The real concatenation element 134 concatenates the compact real depth feature representation ($Z_r$) and the compact feature representation (Z) and provides the concatenated feature representation $\{Z_r, Z\}$ to real decoder 136. The real decoder 136 converts the compact feature representation (Z) to a refined acquisition image data 139 that is conditioned on the compact real depth features, e.g., the compact real depth feature representation ($Z_r$). More specifically, the real decoder 136 is trained to convert the concatenated feature representation $\{Z_r, Z\}$ back to an improved (or refined) version of the low-quality real acquisition data 102. The refined real acquisition data 139 is then fed to the training supervision element 140 for performing supervised training.

As shown in the example of FIG. 1B, the real decoder 136 converts the compact feature representation (Z) of the low-quality (or inaccurate) depth map D to a refined depth map D' conditioned on the compact real depth feature representation ($Z_s$) of the input RGB image. The refined depth map D' is then fed to the training supervision element 140.

The training supervision element 140 is configured to train the real conditional depth prediction branch network 130 using direct supervised learning. In some implementations, the training supervision element 140 determines a loss by comparing the refined real acquisition data 139 and the low-quality real acquisition data 102. For example, a loss can be placed on the difference between the refined real acquisition data 139 and the low-quality real acquisition data 102. The training supervision element 140 then updates parameters 116 of the real conditional depth prediction branch network 130 based on the loss. For example, training supervision element 140 computes a parameter update 116 of the elements of the real conditional depth prediction branch network 130 (e.g., the real encoder 132, the real concatenation element 134, and real decoder 136) and the cross-domain encoder 120 by applying backpropagation of the gradient of the parameters with respect to the loss.

As noted above, FIG. 1C depicts the example components of the cross-domain training framework 100 that collectively constitute the neural network-based domain adaptive refinement model 150, according to some implementations. More specifically, the neural network-based domain adaptive refinement model 150 includes the cross-domain encoder 120, the real encoder 132, the real concatenation element 134, and the synthetic decoder 116.

Figure 2:
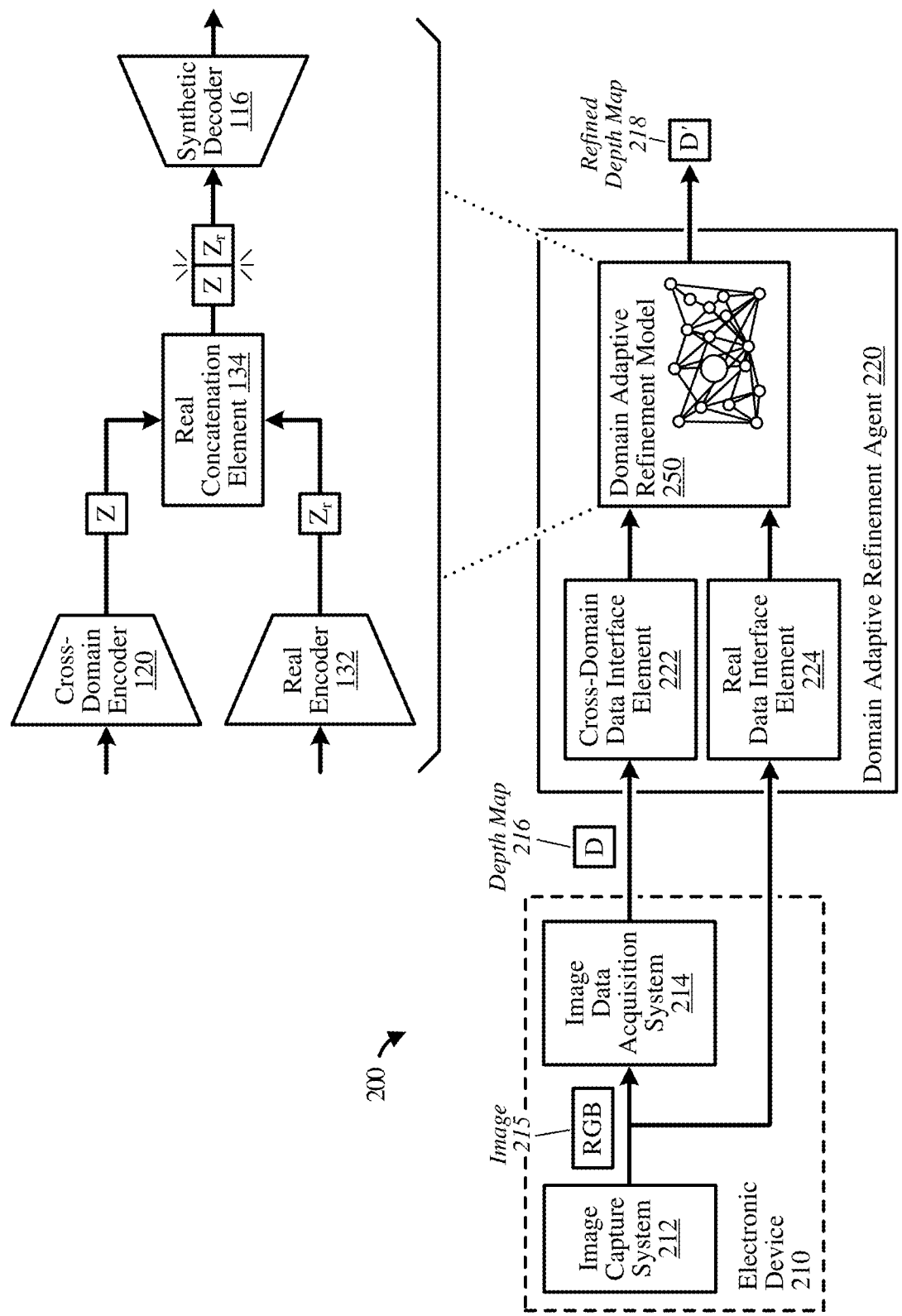
FIG. 2 depicts a block diagram illustrating an example cross-domain acquisition data refinement system, according to some implementations.

FIG. 2 depicts a block diagram illustrating an example cross-domain acquisition data refinement system 200, according to some implementations. More specifically, the example of FIG. 2 illustrates operation of a trained neural network-based domain adaptive refinement agent 220 for refining (or upsampling) a low-quality depth map D during test (or operation) time. As shown in the example of FIG. 2, the example cross-domain acquisition data refinement system 200 includes an electronic device 210 and the domain adaptive refinement agent 220.

The electronic device 210 includes an image caption system 212 and an image data acquisition system 214. Other components or modules are also possible. The image caption system 212 can be any system, e.g., camera, phone, etc., capable of capturing an image 215, e.g., RGB image. The image 215 is fed to the image data acquisition system 214. The image data acquisition system 214 processes the image 215 to generate (or compute) image acquisition data, e.g., low resolution depth maps, optical flows, normal maps, segmentation maps, etc. As shown in the example of FIG. 2, the image data acquisition system 214 is a depth prediction system that includes depth acquisition hardware, e.g., iPhone stereo cameras, time of flight cameras, etc., that processes the image 215 to generate (or compute) a depth map D 216. As discussed herein, due to restrictions around the depth acquisition hardware and the quality of single image depth prediction methods, the generated (or computed) depth map D 216 is often lower quality than the corresponding image 215 from which the computed depths are determined. Indeed, the computed depths are often inaccurate, low resolution and noisy.

The domain adaptive refinement agent 220 includes a cross-domain data interface element 222, a real data interface element 224 and a (trained) domain adaptive refinement model 250. The domain adaptive refinement agent 250 can be the neural network-based domain adaptive refinement agent 150 of FIG. 1C, although alternative configurations are possible. The cross-domain data interface element 222 is configured to receive and feed the depth map D 216 to the (trained) domain adaptive refinement model 250. In some implementations, the cross-domain data interface element 222 can process, massage, and/or otherwise alter the depth map D 216 prior to feeding the depth map D 216 to the (trained) domain adaptive refinement model 250. The real data interface element 224 is configured to receive and feed the RGB image 215 to the (trained) domain adaptive refinement model 250. In some implementations, the cross-domain data interface element 222 can process, massage, and/or otherwise alter the RGB image 215 data prior to feeding the RGB image 215 to the (trained) domain adaptive refinement model 250.

As discussed herein, the domain adaptive refinement model 250 is initially trained using a cross-domain training framework such as, for example, the cross-domain training framework 100 of FIGS. 1A and 1B. As discussed herein, the cross-domain training framework 100 is a two-branch network with two guided decoder branches (one for synthetic data and one for real data) and one shared guided encoder. As shown in the example of FIG. 2, the domain adaptive refinement model 250 includes multiple components of the cross-domain training framework 100. More specifically, the domain adaptive refinement model 250 includes the cross-domain encoder 120, the real encoder 132, the real concatenation element 134, and the synthetic decoder 116.

During operation (or test time), the domain adaptive refinement model 250 receives the depth map D 216 and the RGB image 215 and produces (or generates) the refined depth map D 218. As discussed herein, the refined depth map D 218 is a synthetic version of the depth map D conditioned on the (real) RGB image 215. More specifically, the cross-domain encoder 120 encodes the depth map (D') 218 into a compact feature representation (Z). The real encoder 132 encodes the RGB image 215 into a compact real conditional depth feature representation ($Z_r$).

As shown in the example of FIG. 2, the real encoder 132 includes image channels for R, G, and B. The compact real conditional depth feature representation ($Z_r$) is fed to the real concatenation element 134. The real concatenation element 134 concatenates the compact real depth feature representation ($Z_r$) and the compact feature representation (Z) and provides the concatenated feature representation {$Z_r$, Z} to the synthetic decoder 116. The synthetic decoder 116 converts the compact real depth feature representation ($Z_r$) to the refined depth map D' 218 that is conditioned on the compact real depth features, e.g., the compact real depth feature representation ($Z_r$).

Figure 3A:
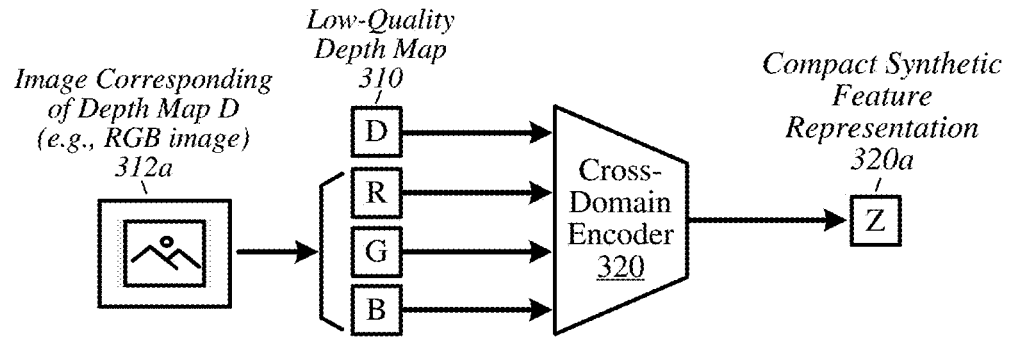
FIGS. 3A-3C depict block diagrams illustrating various example operations of a cross-domain encoder that is fed a low-quality depth map (D) and various additional information to improve performance of the encoder, according to some implementations.
Figure 3B:
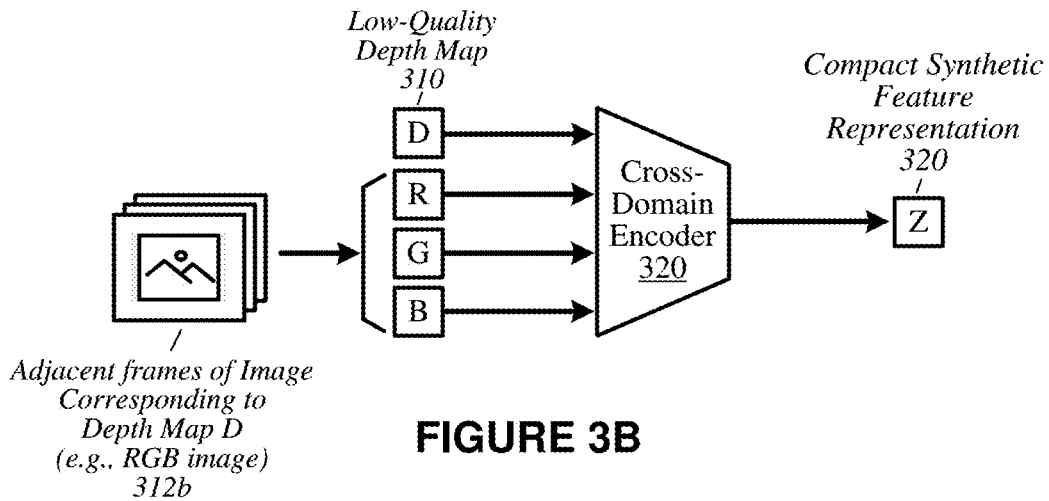
Figure 3C:
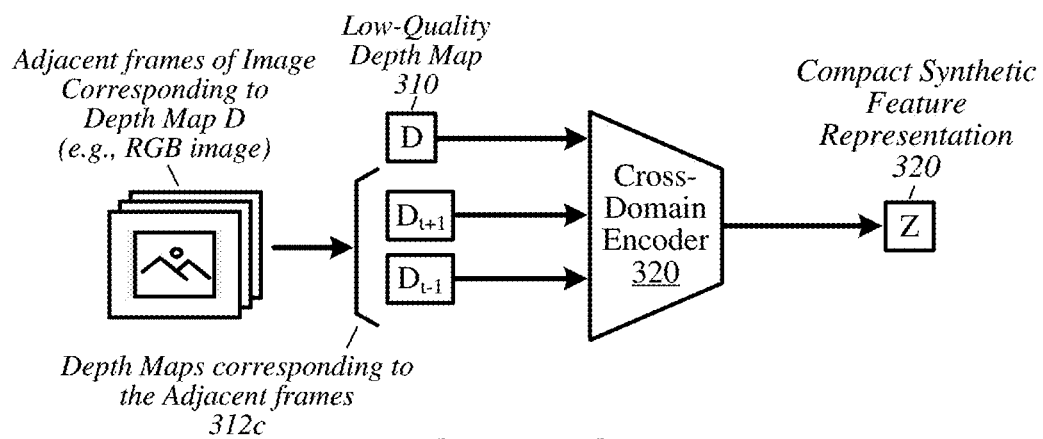

FIGS. 3A-3C depict block diagrams illustrating various example operations of a cross-domain encoder 320 that is fed a low-quality depth map (D) 310 and various additional information to improve performance of the encoder, according to some implementations. As discussed herein, the depth map (D) is fed to the cross-domain encoder 320 which, in turn, encodes the depth map (D) into a compact synthetic feature representation (Z). In addition to the low-quality depth map (D) 310, the examples of FIGS. 3A-3C illustrate feeding various additional information to improve performance of the encoder.

As shown in the example of FIG. 3A, the additional information includes a high-resolution image 312a from which the low-quality depth map (D) 310 is computed to the cross-domain encoder 320. More specifically, as shown in the example of FIG. 3A, the cross-domain encoder 320 has four input channels, three for image (R, G and B channels of the image) and one for depth (e.g., disparity map).

Referring next to the example of FIG. 3B, the additional information includes adjacent frames (or high-resolution images) 312b of the frame (or image) from which the low-quality depth map (D) 310 is computed (FIG. 3B). As shown in the example of FIG. 3B, the cross-domain encoder 320 has four input channels, three for image (R, G and B channels of the image) and one for depth (e.g., disparity map). The adjacent frames (or high-resolution images) 312b are fed to the R, G and B channels in series, however, in other implementations, the cross-domain encoder 320 can include additional input channels, e.g., R, G and B channels for each of the adjacent frames (or high-resolution images) 312b.

Lastly, as shown in the example of FIG. 3C, the additional information includes depth maps 312c corresponding to the adjacent frames (or high-resolution images) of the frame (or image) from which the low-quality depth map (D) 310 is computed. More specifically, as shown in the example of FIG. 3C, the cross-domain encoder 320 has three input channels, one for the depth map (e.g., disparity map).

Figure 4:
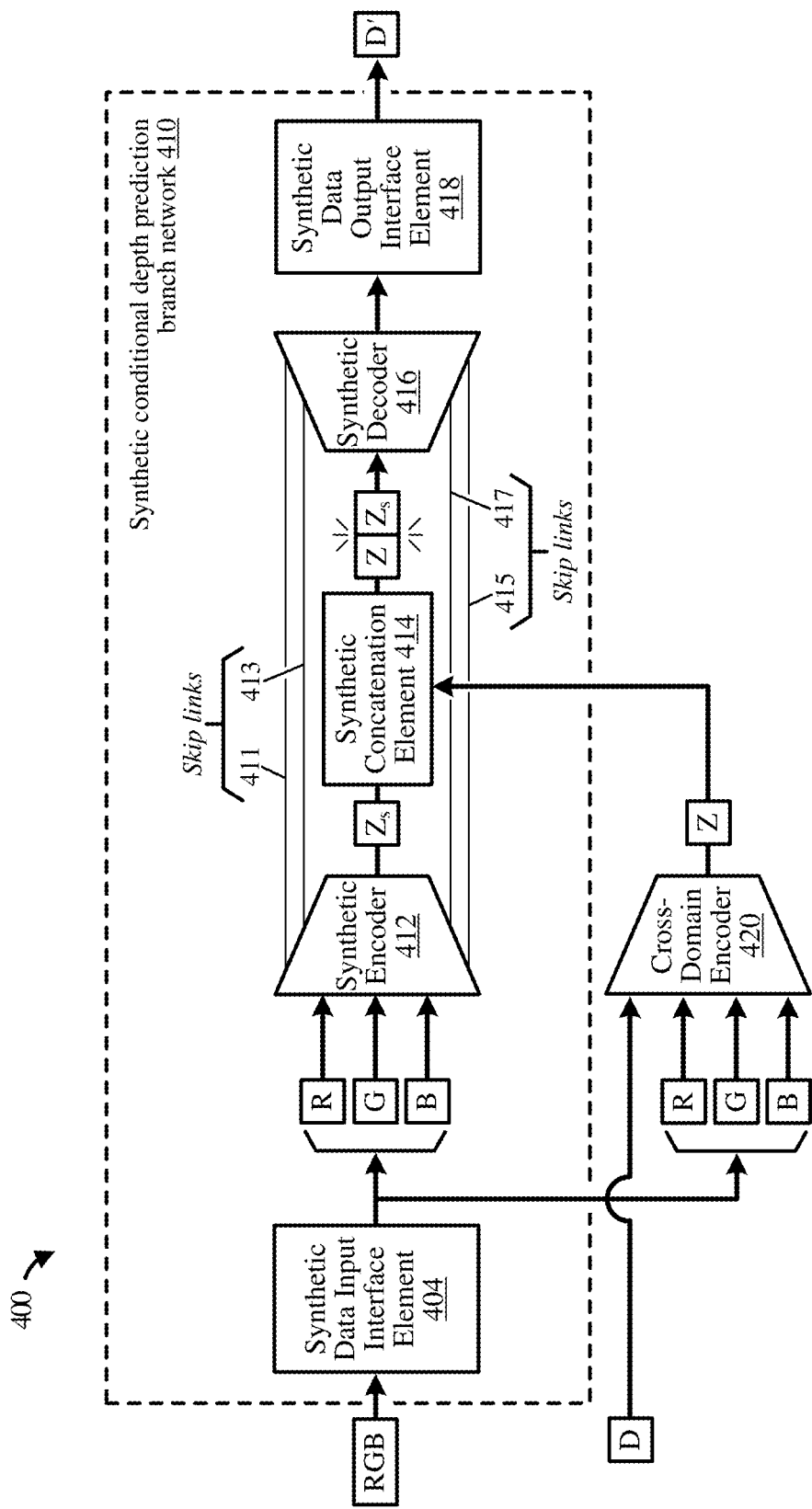
FIG. 4 depicts a block diagram illustrating a more detailed example of various components of a cross-domain training framework, according to some implementations.

FIG. 4 depicts a block diagram illustrating a more detailed example of various components of a cross-domain training framework 400, according to some implementations. More specifically, the example of FIG. 4 illustrates the limited use of skip links for training a synthetic conditional depth prediction branch network 410. Although a synthetic conditional depth prediction branch network is shown and discussed in the example of FIG. 4, a similar process can be utilized with limited use of skip links for training a real conditional depth prediction branch network.

The example of FIG. 4 includes a synthetic conditional depth prediction branch network 410 and a cross-domain encoder 420. The synthetic conditional depth prediction branch network 410 and the cross-domain encoder 420 can be the synthetic conditional depth prediction branch network 110 and the cross-domain encoder 120 of FIGS. 1A and 1B, although alternative configurations are possible. The synthetic conditional depth prediction branch network 410 includes a synthetic data input interface element 404, a synthetic encoder 412, a synthetic concatenation element 414, a synthetic decoder 416, and a synthetic data output interface element 418. Other components or modules are also possible.

As discussed herein, a key limitation with guided upsampling (or refinement) systems is that skip links can allow information to flow too easily. Indeed, common UNETs (e.g., Convolutional Neural Networks) used for joint upsampling tasks allow excess information to flow via the skip links. This free flow of information inhibits the ability of these networks to learn high level features of low-quality acquisition data, e.g., depth maps. Instead, these networks tend to rely on low level edge cues from conditional data, e.g., the RGB image.

In operation, the synthetic data input interface element 404 receives and processes an RGB image. The image is passed to a synthetic encoding layer (synthetic encoder 412) which, in turn, encodes the RBG image into a compact synthetic conditional depth feature representation ($Z_s$). As shown in the example of FIG. 4, the synthetic encoder 412 includes image channels for R, G, and B. The compact synthetic conditional depth feature representation ($Z_s$) is fed to the synthetic concatenation element 414.

The cross-domain encoder 420 includes an input channel for receiving and encoding a depth (or disparity) map (D). The depth map (D) is fed to the cross-domain encoder 420 which, in turn, encodes the depth map (D) into a compact synthetic feature representation (Z). As shown in the example of FIG. 4, the cross-domain encoder 420 also includes additional red (R), green (G), and blue (B) input channels to improve performance of the encoder. The compact synthetic feature representation (Z) is fed to the synthetic concatenation element 414. The synthetic concatenation element 414 concatenates the compact synthetic conditional depth feature representation ($Z_s$) and the compact synthetic feature representation (Z) and passes the concatenated RGBD encoding information and RGB image level information to a synthetic decoding layer (synthetic decoder 416).

The synthetic decoder 416 converts the compact feature representation (Z) of the low-quality (or inaccurate) depth map D to a refined depth map D' conditioned on the compact synthetic depth feature representation ($Z_s$) of the input RGB image. As shown in the example of FIG. 4, during the decoding process there are skip links 411, 413, 415, and 417 connecting the synthetic decoding layer (synthetic decoder 416) and the synthetic encoding layer (synthetic encoder 412). The skip links attempt to borrow low-level information (e.g., edges, boundary details, etc.) from the RGB image to reconstruct the depth map (D). However, in the example of FIG. 4, the skip links 411, 413, 415, and 417 only connect the synthetic decoding layer (synthetic decoder 416) and the synthetic encoding layer (synthetic encoder 412). Advantageously, there are no skip links connecting the synthetic decoding layer (synthetic decoder 416) and the cross-domain encoding layer (cross-domain encoder 420). As discussed herein, removing the skip links alleviates boundary artifacts.

Figure 5:
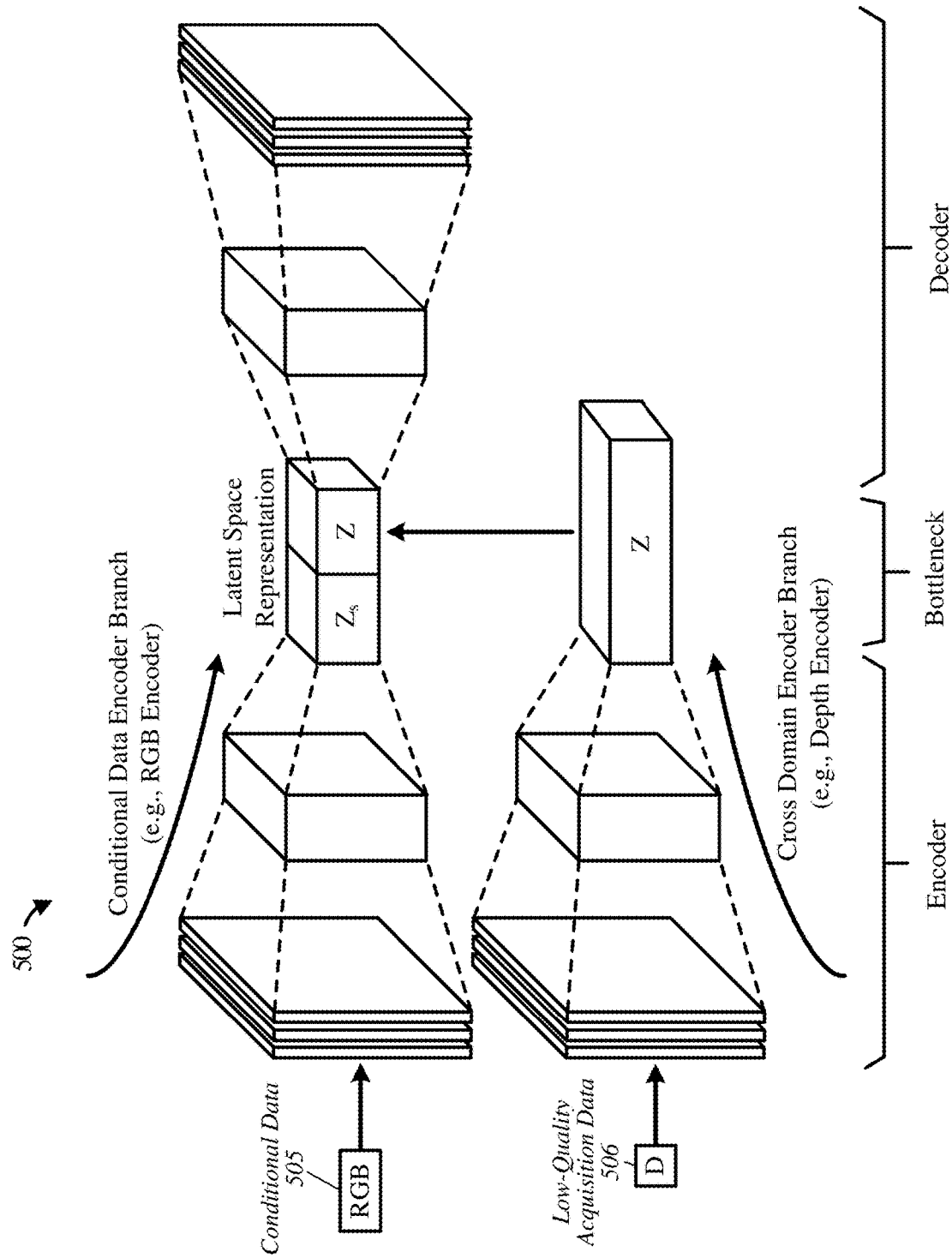
FIG. 5 depicts a diagram illustrating a more detailed example of graphical encoding and decoding operations performed by a neural network-based domain adaptive refinement agent, according to some implementations.

FIG. 5 depicts a diagram illustrating a more detailed example of graphical encoding and decoding operations 500 performed by a neural network-based domain adaptive refinement agent, according to some implementations. More specifically, the example of FIG. 5 depicts a more detailed example of operations of a cross-domain encoder for encoding low-quality image acquisition data 506 and a conditional data encoder for encoding conditional data 505.

Figure 6:
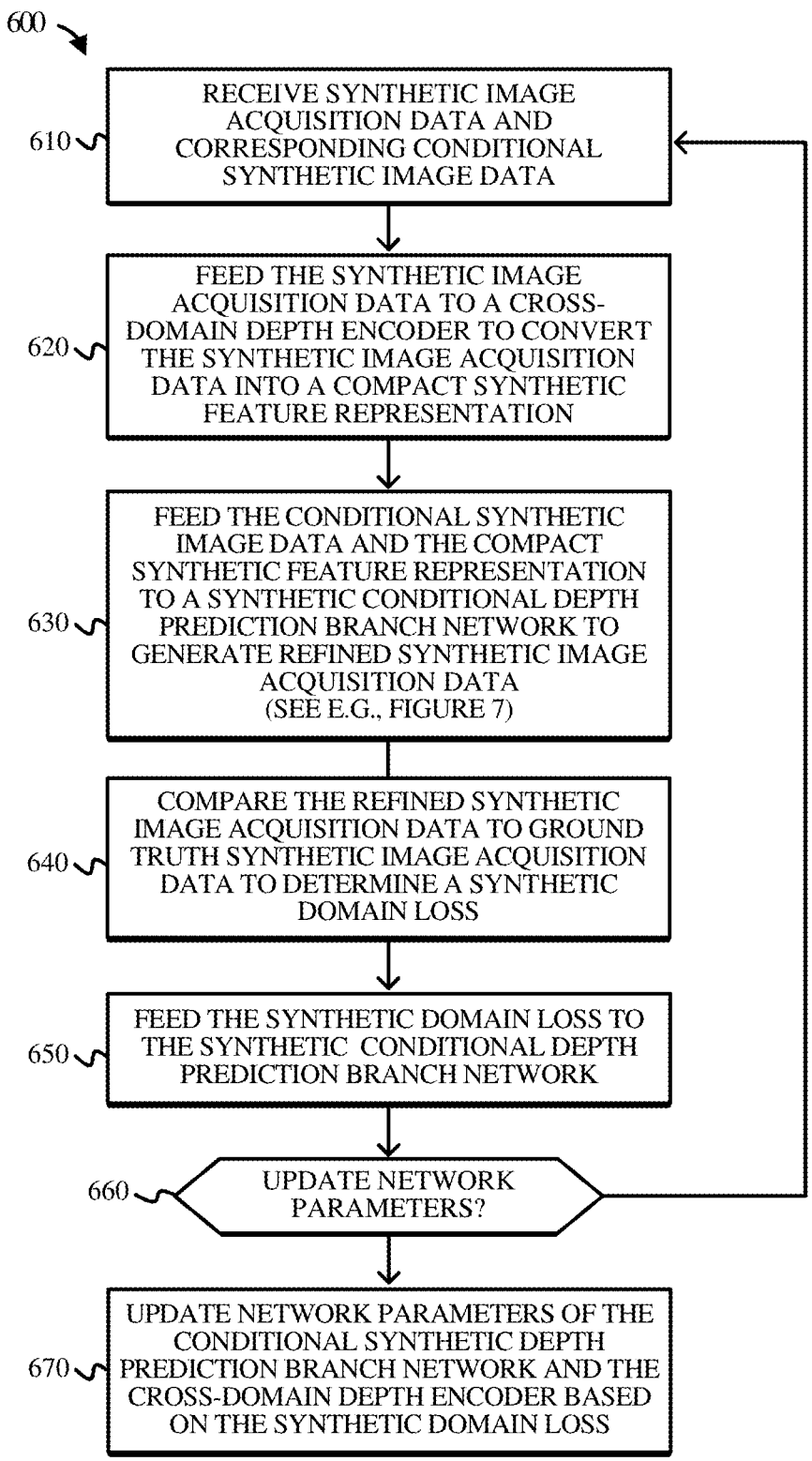
FIG. 6 depicts a flow diagram illustrating an example cross-domain training process for training a neural network-based domain adaptive refinement agent with synthetic data, according to some implementations.

FIG. 6 depicts a flow diagram illustrating an example cross-domain training process 600 for training a neural network-based domain adaptive refinement agent with synthetic data, according to some implementations. The example cross-domain training process 600 may be performed in various implementations by a cross-domain training framework such as, for example, the cross-domain training framework 100 of FIG. 1A or 1B, or one or more processors, modules, engines, or components associated therewith.

To begin, at 610, the cross-domain training framework receives conditional synthetic image data and corresponding synthetic image acquisition data. At 620, the cross-domain training framework feeds the synthetic image acquisition data to a cross-domain depth encoder to convert the synthetic image acquisition data to a compact synthetic feature representation. As discussed herein, the cross-domain depth encoder is configured to receive and encode the synthetic image acquisition data into the compact synthetic feature representation.

At 630, the cross-domain training framework feeds the compact synthetic feature representation and the conditional synthetic image data to a synthetic conditional depth prediction branch network to generate a refined version of the synthetic image acquisition data conditioned on the conditional synthetic image data. At 640, the cross-domain training framework compares the refined version of the of the synthetic image acquisition data to ground truth synthetic image acquisition data to calculate a synthetic domain loss. At 650, the cross-domain training framework feeds the synthetic domain loss to the synthetic conditional depth decoder branch network.

At 660, the cross-domain training framework determines whether network parameters of the cross-domain depth encoder and the synthetic conditional depth prediction branch network should be updated based on the synthetic domain loss. If the network parameters of the cross-domain depth encoder and the synthetic conditional depth prediction branch network do not need to be updated, the process continues at 610. Otherwise, at 670, the cross-domain training framework updates the network parameters of the cross-domain depth encoder and the synthetic conditional depth prediction branch network based on the synthetic domain loss.

Figure 7:
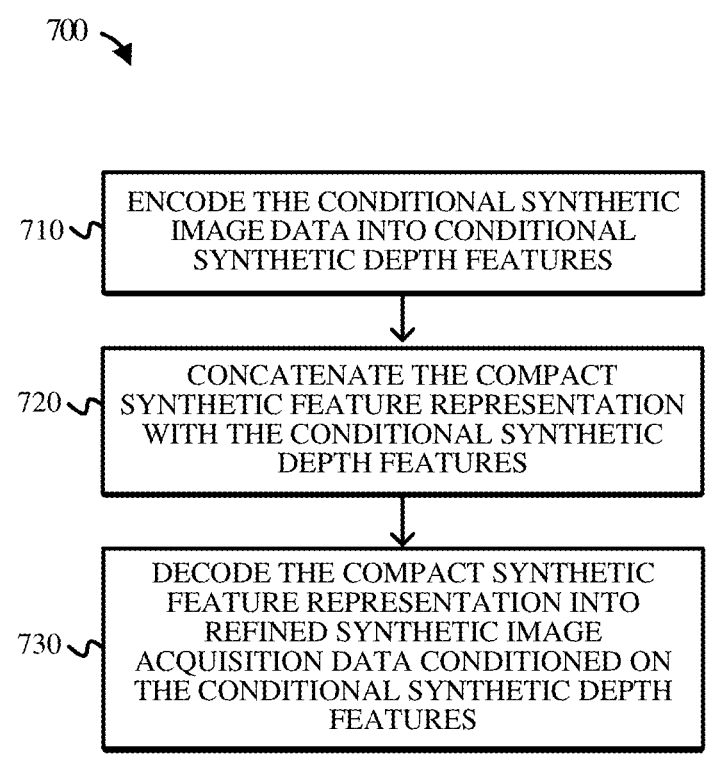
FIG. 7 depicts a flow diagram illustrating an example cross-domain training process for feeding conditional synthetic image data and a compact synthetic feature representation to a synthetic conditional depth prediction branch network to generate refined synthetic image acquisition data.

FIG. 7 depicts a flow diagram illustrating an example cross-domain training process 700 for feeding conditional synthetic image data and a compact synthetic feature representation to a synthetic conditional depth prediction branch network to generate refined synthetic image acquisition data. The example cross-domain training process 700 may be performed in various implementations by a cross-domain training framework such as, for example, the cross-domain training framework 100 of FIG. 1A or 1B, or one or more processors, modules, engines, or components associated therewith.

To begin, at 710, the cross-domain training framework encodes the synthetic image into conditional synthetic depth features. At 720, the cross-domain training framework concatenates the compact synthetic feature representation with the conditional synthetic depth features. Lastly, at 730, the cross-domain training framework decodes the compact synthetic feature representation into refined synthetic image acquisition data conditioned on the conditional synthetic depth features.

Figure 8:
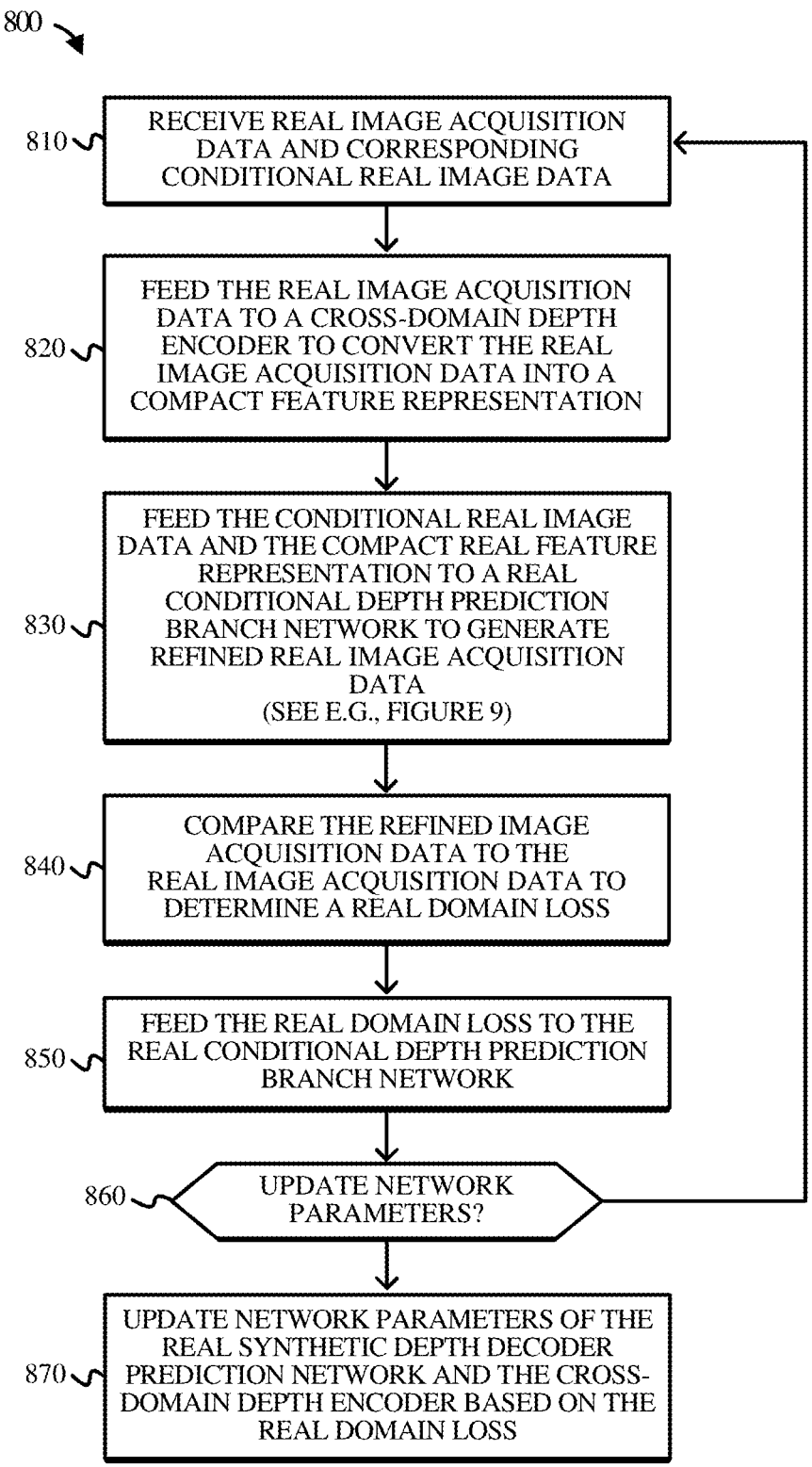
FIG. 8 depicts a flow diagram illustrating an example cross-domain training process for training a neural network-based domain adaptive refinement agent with real data, according to some implementations.

FIG. 8 depicts a flow diagram illustrating an example cross-domain training process 800 for training a neural network-based domain adaptive refinement agent with real data, according to some implementations. The example cross-domain training process 800 may be performed in various implementations by a cross-domain training framework such as, for example, the cross-domain training framework 100 of FIG. 1A or 1B, or one or more processors, modules, engines, or components associated therewith.

To begin, at 810, the cross-domain training framework receives conditional real image data and corresponding real image acquisition data. At 820, the cross-domain training framework feeds the real image acquisition data to a cross-domain depth encoder to convert the real image acquisition data to a compact real feature representation. As discussed herein, the cross-domain depth encoder is configured to receive and encode the real image acquisition data into the compact synthetic feature representation.

At 830, the cross-domain training framework feeds the compact real feature representation and the conditional real image data to a real conditional depth prediction branch network to generate a refined version of the real image acquisition data conditioned on the conditional real image data. At 840, the cross-domain training framework compares the refined version of the of the real image acquisition data to the original real image acquisition data to calculate a real domain loss. At 850, the cross-domain training framework feeds the real domain loss to the real conditional depth prediction branch network.

At 860, the cross-domain training framework determines whether network parameters of the cross-domain depth encoder and the real conditional depth prediction branch network should be updated based on the real domain loss. If the network parameters of the cross-domain depth encoder and the real conditional depth prediction branch network do not need to be updated, the process continues at 610. Otherwise, at 870, the cross-domain training framework updates the network parameters of the cross-domain depth encoder and the real conditional depth prediction branch network based on the real domain loss.

Figure 9:
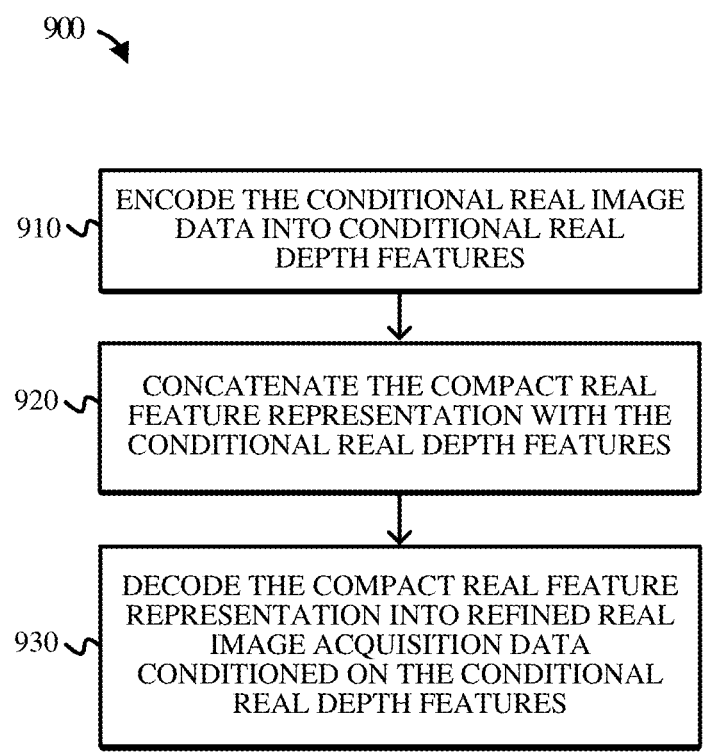
FIG. 9 depicts a flow diagram illustrating an example cross-domain training process for feeding conditional synthetic image data and a compact synthetic feature representation to a synthetic conditional depth prediction branch network to generate refined synthetic image acquisition data.

FIG. 9 depicts a flow diagram illustrating an example cross-domain training process 900 for feeding conditional synthetic image data and a compact synthetic feature representation to a synthetic conditional depth prediction branch network to generate refined synthetic image acquisition data. The example cross-domain training process 900 may be performed in various implementations by a cross-domain training framework such as, for example, the cross-domain training framework 100 of FIG. 1A or 1B, or one or more processors, modules, engines, or components associated therewith.

To begin, at 910, the cross-domain training framework encodes the real image into conditional real depth features. At 920, the cross-domain training framework concatenates the compact real feature representation with the conditional real depth features. Lastly, at 930, the cross-domain training framework decodes the compact real feature representation into refined real image acquisition data conditioned on the conditional synthetic depth features.

Figure 10:
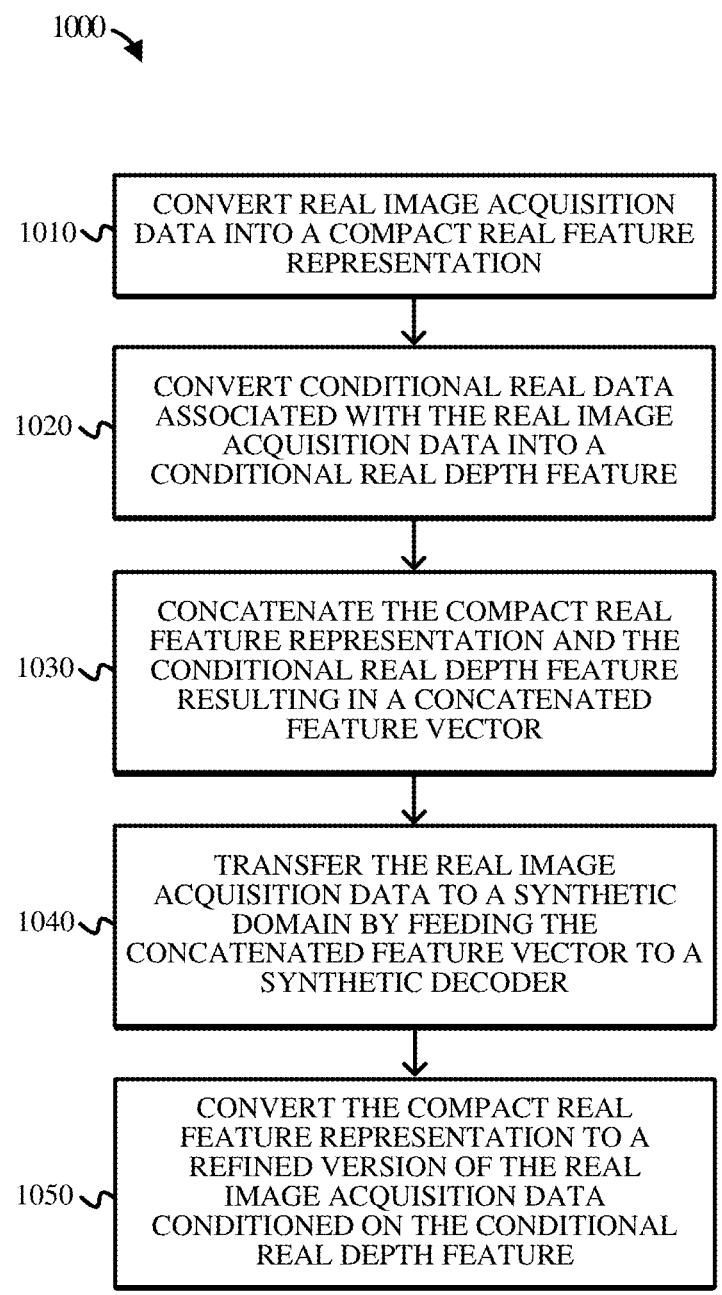
FIG. 10 depicts a flow diagram illustrating example operations of a trained neural network-based domain adaptive refinement agent for refining (or upsampling) low-quality real image acquisition data, according to some implementations.

FIG. 10 depicts a flow diagram illustrating example operations 1000 of a trained neural network-based domain adaptive refinement agent for refining (or upsampling) low-quality real image acquisition data, according to some implementations. The example operations 1000 may be performed in various implementations by a neural network-based domain adaptive refinement agent such as, for example, the neural network-based domain adaptive refinement agent 150 of FIG. 1C or the domain adaptive refinement agent 220 of FIG. 2, or one or more processors, modules, engines, or components associated therewith.

To begin, the neural network-based domain adaptive refinement agent receives real image acquisition data and real image data associated with the real image acquisition data. At 1010, the neural network-based domain adaptive refinement agent converts the real image acquisition data into a compact real feature representation. At 1020, the neural network-based domain adaptive refinement agent converts the conditional real data associated with the real image acquisition data into a conditional real depth feature.

At 1030, the neural network-based domain adaptive refinement agent concatenates the compact real feature representation and the conditional real depth feature resulting in a concatenated feature vector. At 1040, the neural network-based domain adaptive refinement agent transfers the real image acquisition data to a synthetic domain by feeding the concatenated feature vector to a synthetic decoder. As discussed herein, the synthetic decoder is a component of the synthetic conditional depth prediction branch network that is trained via cross-domain training framework discussed herein. Lastly, at 1050, the neural network-based domain adaptive refinement agent converts the compact real feature representation to a refined version of real image acquisition data conditioned on the conditional real depth feature.

Figure 11D:
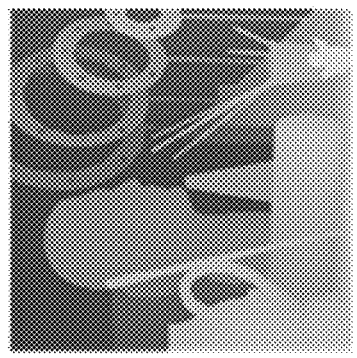
FIGS. 11A-11D depict various example depth map images, according to some implementations.
Figure 11C:
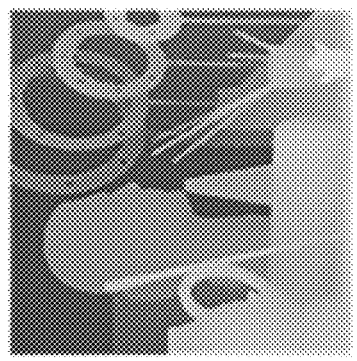
Figure 11B:
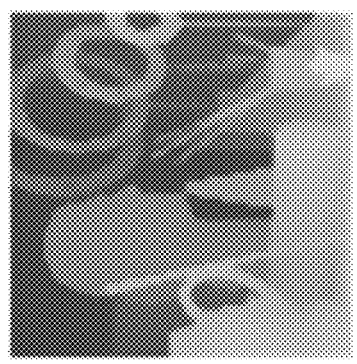
Figure 11A:
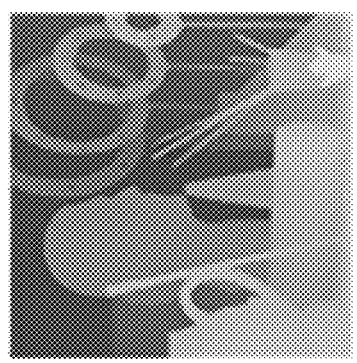

FIGS. 11A-11D depict various example depth map images, according to some implementations. FIGS. 11A and 11B depict various example depth map output results of a prior art guided upsampling (or joint depth refinement) system, according to some implementations. More specifically, the depth map output results are eight times (8×) upsampled depth map output results of an existing guided upsampling (or joint depth refinement) system. As discussed herein, the existing guided upsampling (or joint depth refinement) systems can be trained with down sampled synthetic-only data. Unfortunately, these systems suffer deficiencies during test time as depth prediction is a high-level task and there is a significant domain gap between real world and synthetic images.

FIGS. 11A and 11B depict depth map outputs of the existing guided upsampling (or joint depth refinement) system that is trained with synthetic data only responsive to being fed a downsampled version of the ground truth synthetic depth map shown in FIG. 11D. More specifically, the depth map outputs shown in FIGS. 11A and 11B are the depth map output of the existing guided upsampling (or joint depth refinement) system when the system is fed the down-sampled version of the ground truth synthetic depth map without and with Gaussian blurring, respectively. As discussed herein, blurring (or otherwise corrupting) the data makes the data appear more like expected (or imperfect) real depth data.

FIG. 11C depicts an example upsampled depth map output result of the guided upsampling (or joint depth refinement) system discussed herein, e.g., the neural network-based domain adaptive refinement agent 150 of FIG. 1C or the domain adaptive refinement agent 220 of FIG. 2. As illustrated in the example of FIG. 11C, the upsampled depth map output result of FIG. 11C is of a higher quality than the depth maps obtained in FIGS. 11A and 11B. Indeed, the guided upsampling (or joint depth refinement) system discussed herein is able to provide higher quality results through domain adaptation as a result of the cross-domain training framework discussed herein.

Figure 12B:
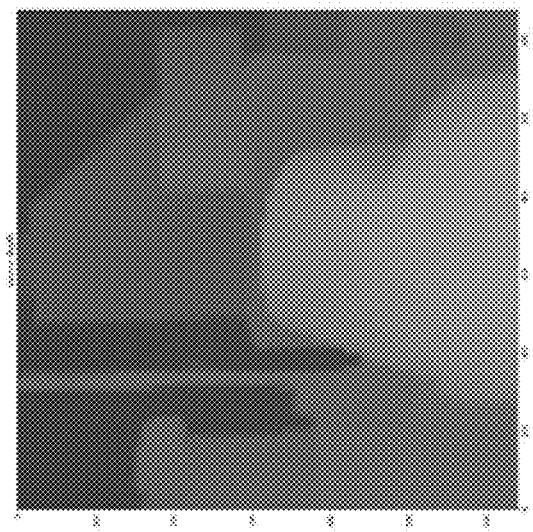
FIGS. 12A-12D depict example input/output images related to the guided upsampling (or joint depth refinement) system discussed herein, according to some implementations.
Figure 12D:
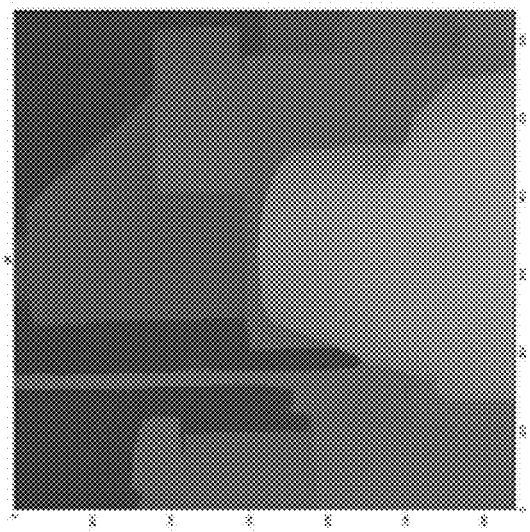
Figure 12A:
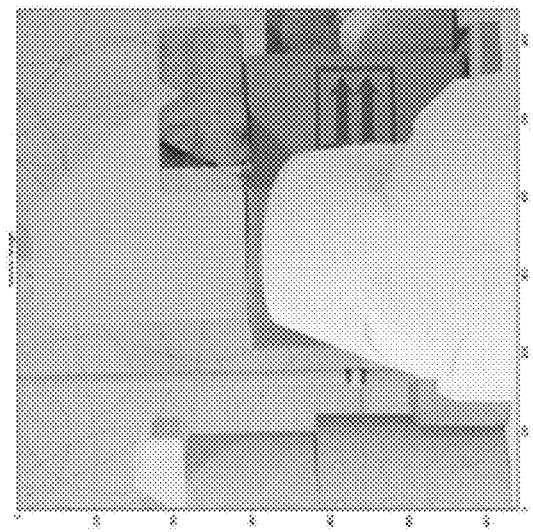
Figure 12C:
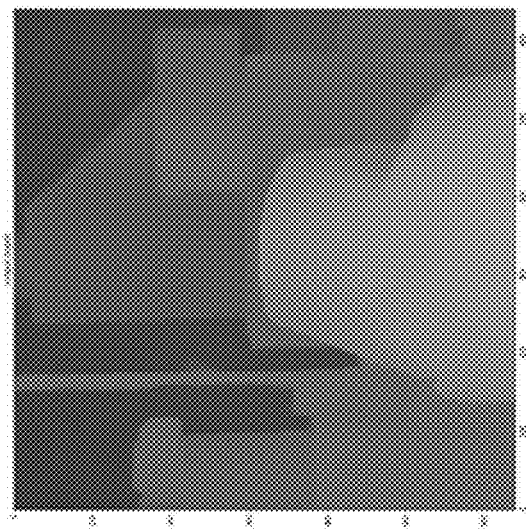

FIGS. 12A-12D depict example input/output images related to the guided upsampling (or joint depth refinement) system discussed herein, e.g., the neural network-based domain adaptive refinement agent 150 of FIG. 1C or the domain adaptive refinement agent 220 of FIG. 2. More specifically, and input image (e.g., conditional data) shown in Figure FIG. 12A and a depth map (e.g., image acquisition data) shown in FIG. 12B are fed to the guided upsampling (or joint depth refinement) system resulting in the upsampled depth map shown in FIG. 12C. FIG. 12D illustrates the ground truth synthetic depth map for comparison.

Figure 13A:
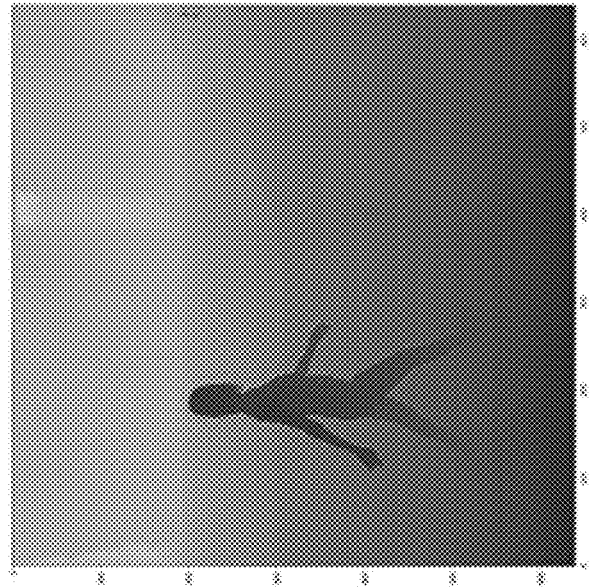
FIGS. 13A and 13B depict example depth map outputs of the existing guided upsampling (or joint depth refinement) system that is trained with synthetic data only and the guided upsampling (or joint depth refinement) system discussed herein, according to some implementations.
Figure 13B:

FIGS. 13A and 13B depict example depth map outputs of the existing guided upsampling (or joint depth refinement) system that is trained with synthetic data only and the guided upsampling (or joint depth refinement) system discussed herein, e.g., the neural network-based domain adaptive refinement agent 150 of FIG. 1C or the domain adaptive refinement agent 220 of FIG. 2.

Figure 14:
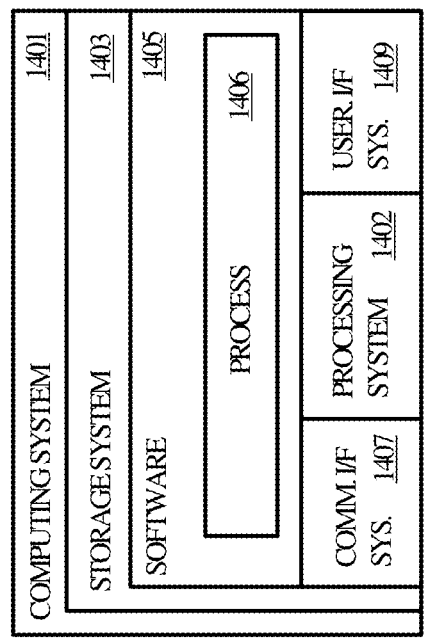
FIG. 14 depicts a block diagram illustrating an example computing system suitable for implementing the technology disclosed herein, including any of the applications, architectures, elements, processes, and operational scenarios and sequences illustrated in the Figures and discussed below in the Technical Disclosure.

FIG. 14 illustrates computing system 1401 that is representative of any system or collection of systems in which the various processes, programs, services, and scenarios disclosed herein may be implemented. Examples of computing system 1401 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 1401 may be implemented as a single apparatus, system, or device or may be implemented in a distributed manner as multiple apparatuses, systems, or devices. Computing system 1401 includes, but is not limited to, processing system 1402, storage system 1403, software 1405, communication interface system 1407, and user interface system 1409 (optional). Processing system 1402 is operatively coupled with storage system 1403, communication interface system 1407, and user interface system 1409.

Processing system 1402 loads and executes software 1405 from storage system 1403. Software 1405 includes and implements process 1406, which is representative of the processes discussed with respect to the preceding Figures. When executed by processing system 1402 to provide packet rerouting, software 1405 directs processing system 1402 to operate as described herein for at least the various processes, operational scenarios, and sequences discussed in the foregoing implementations. Computing system 1401 may optionally include additional devices, features, or functionality not discussed for purposes of brevity.

Continuing with the example of FIG. 14, processing system 1402 may comprise a micro-processor and other circuitry that retrieves and executes software 1405 from storage system 1403. Processing system 1402 may be implemented within a single processing device but may also be distributed across multiple processing devices or sub-systems that cooperate in executing program instructions. Examples of processing system 1402 include general purpose central processing units, graphical processing units, application specific processors, and logic devices, as well as any other type of processing device, combinations, or variations thereof.

Storage system 1403 may comprise any computer readable storage media readable by processing system 1402 and capable of storing software 1405. Storage system 1403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1403 may also include computer readable communication media over which at least some of software 1405 may be communicated internally or externally. Storage system 1403 may be implemented as a single storage device but may also be implemented across multiple storage devices or sub-systems co-located or distributed relative to each other. Storage system 1403 may comprise additional elements, such as a controller, capable of communicating with processing system 1402 or possibly other systems.

Software 1405 (including learning process 1406) may be implemented in program instructions and among other functions may, when executed by processing system 1402, direct processing system 1402 to operate as described with respect to the various operational scenarios, sequences, and processes illustrated herein. For example, software 1405 may include program instructions for implementing a reinforcement learning process to learn an optimum scheduling policy as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1405 may include additional processes, programs, or components, such as operating system software, virtualization software, or other application software. Software 1405 may also comprise firmware or some other form of machine-readable processing instructions executable by processing system 1402.

In general, software 1405 may, when loaded into processing system 1402 and executed, transform a suitable apparatus, system, or device (of which computing system 1401 is representative) overall from a general-purpose computing system into a special-purpose computing system customized to provide motion learning. Indeed, encoding software 1405 on storage system 1403 may transform the physical structure of storage system 1403. The specific transformation of the physical structure may depend on various factors in different implementations of this description. Examples of such factors may include, but are not limited to, the technology used to implement the storage media of storage system 1403 and whether the computer-storage media are characterized as primary or secondary storage, as well as other factors.

For example, if the computer readable storage media are implemented as semiconductor-based memory, software 1405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A cross domain supervised learning-based system for iteratively training a domain adaptive refinement agent, the system comprising:
- a cross-domain encoder configured to convert synthetic and real image acquisition data derived from a video into compact synthetic and real feature representations respectively, wherein the synthetic and real feature image acquisition data comprises a frame of the video, the cross-domain encoder comprising at least four input channels, wherein three of the at least four input channels respectively comprise red (R), green (G), and blue (B) input channels for an RGB image corresponding to the frame of the video, and a fourth input channel comprises the real image acquisition data, wherein the real image acquisition data is a depth map corresponding to the RGB image;
- a synthetic conditional depth prediction branch network comprising a synthetic encoder and a synthetic decoder, and configured to convert the compact synthetic feature representation to a refined version of the synthetic image acquisition data, the synthetic encoder outputting a compact synthetic conditional depth feature representation, the compact synthetic conditional depth feature representation concatenated with the compact synthetic feature representation output from the cross-domain encoder for input to the synthetic decoder to generate the refined version of the synthetic image acquisition data;
- a real conditional depth prediction branch network configured to convert the compact real feature representation to a refined version of the real image acquisition data; and
- a training supervision element configured to iteratively train the domain adaptive refinement agent based on the refined versions of the synthetic image acquisition data from the synthetic conditional depth prediction branch network and the real image acquisition data from the real conditional depth prediction branch network.

2. The cross domain supervised learning-based system of claim 1, wherein to iteratively train the domain adaptive refinement agent, the training supervision element is configured to:
- compare the refined version of the synthetic image acquisition data to ground truth synthetic image acquisition data;
- calculate a synthetic domain loss based on the comparison;
- feed the synthetic domain loss to the synthetic conditional depth prediction branch network to update parameters of the synthetic encoder and the synthetic decoder; and
- feed the synthetic domain loss to the cross-domain encoder to update parameters of the cross-domain encoder.

3. The cross domain supervised learning-based system of claim 1, wherein to iteratively train the domain adaptive refinement agent, the training supervision element is configured to:
- compare the refined version of the real image acquisition data to the real image acquisition data;
- calculate a real domain loss based on the comparison;
- feed the real domain loss to the real conditional depth prediction branch network to update parameters of a real encoder and a real decoder; and
- feed the real domain loss to the cross-domain encoder to update parameters of the cross-domain encoder.

4. The cross domain supervised learning-based system of claim 1, the synthetic conditional depth prediction branch network comprising:
- a synthetic concatenation element configured to concatenate the compact synthetic feature representation with the compact synthetic conditional depth feature representation from the synthetic encoder, wherein the compact synthetic feature representation is passed through the synthetic concatenation element to the synthetic decoder.

5. The cross domain supervised learning-based system of claim 1, the real conditional depth prediction branch network comprising:
- a real concatenation element configured to concatenate the compact real feature representation with a real conditional depth feature.

6. The cross domain supervised learning-based system of claim 1, wherein the synthetic conditional depth prediction branch network comprises a convolutional neural network with skip links that connect outputs of convolutional layers in the synthetic encoder to inputs of the convolutional layers of the synthetic decoder.

7. The cross domain supervised learning-based system of claim 1, wherein the real conditional depth prediction branch network comprises a convolutional neural network with skip links that connect outputs of convolutional layers in a real encoder to inputs of the convolutional layers of a real decoder.

8. The cross domain supervised learning-based system of claim 1, wherein the synthetic conditional depth prediction branch network is configured to limit the size of the compact synthetic feature representation, and wherein the real conditional depth prediction branch network is configured to limit the size of the compact real feature representation.

9. The cross domain supervised learning-based system of claim 1, wherein the compact synthetic feature representation from the cross-domain encoder is passed through to the synthetic decoder without skip links connecting the cross-domain encoder with the synthetic decoder.

10. A method of refining image acquisition data through domain adaptation, the method comprising:
- converting, by a cross-domain encoder, real image acquisition data into a compact real feature representation, wherein the cross-domain encoder receives inputs from at least four input channels three of the at least four input channels respectively comprise red (R), green (G), and blue (B) input channels for RGB images from a video, and a fourth input channel comprises the real image acquisition data, wherein the real image acquisition data input to the fourth input channel comprises a depth map computed from an RGB image from the video, and RGB inputs to the RGB input channels comprise a first frame and a second frame that are each adjacent to the RGB image in the video;
- converting, by a real encoder, conditional real data into a conditional real depth feature; and
- generating, by a synthetic decoder, a refined version of the real image acquisition data based on the conditional real data, the compact real feature representation from the cross-domain encoder passed through to the synthetic decoder to generate the refined version of the real image acquisition data, wherein the refined version of the real image acquisition data is generated by converting the compact real feature representation to the refined version of real image acquisition data conditioned on the conditional real depth feature.

11. The method of claim 10, wherein passing the compact real feature representation from the cross-domain encoder through to the synthetic decoder includes:
concatenating, by a real concatenation element, the compact real feature representation and the conditional real depth feature resulting in a concatenated feature vector; and
feeding the concatenated feature vector to the synthetic decoder.

12. The method of claim 10, wherein the conditional real data is of a different modality and of a higher quality than the corresponding real image acquisition data, and wherein the different modality comprises images or video frames.

13. The method of claim 10, wherein the compact real feature representation from the cross-domain encoder is passed through to the synthetic decoder without skip links connecting the cross-domain encoder with the synthetic decoder.

14. A supervised learning-based method of iteratively training a domain adaptive refinement agent, the method comprising:
feeding synthetic image acquisition data and real image acquisition data derived from a video to a cross-domain encoder to convert the synthetic image acquisition data and the real image acquisition data to a compact synthetic feature representation and a compact real feature representation, respectively, wherein the synthetic image acquisition data and the real image acquisition data comprises a frame of the video, the cross-domain encoder comprising at least four input channels, wherein three of the at least four input channels respectively comprise red (R), green (G), and blue (B) input channels for an RGB image corresponding to the frame of the video, and a fourth input channel comprises the real image acquisition data, wherein the real image acquisition data is a depth map corresponding to the RGB image;
feeding the compact synthetic feature representation from the cross-domain depth encoder and conditional synthetic image data to a synthetic conditional depth prediction branch network to generate a refined version of the synthetic image acquisition data conditioned on the conditional synthetic image data, the synthetic conditional depth prediction branch network comprising a synthetic encoder and a synthetic decoder, the synthetic encoder outputting a compact synthetic conditional depth feature representation, the compact synthetic conditional depth feature representation concatenated with the compact synthetic feature representation output from the cross-domain encoder for input to the synthetic decoder to generate the refined version of the synthetic image acquisition data;
feeding the compact real feature representation from the cross-domain encoder and conditional real image data to a real conditional depth prediction branch network to generate a refined version of the real image acquisition data conditioned on the conditional real image data the real conditional depth prediction branch network comprising a real encoder and a real decoder, the real encoder outputting a compact real conditional depth feature representation, the compact real conditional depth feature representation concatenated with the compact synthetic feature representation output from the cross-domain encoder for input to the real decoder to generate the refined version of the real image acquisition data;
comparing the refined version of the synthetic image acquisition data to ground truth synthetic image acquisition data to calculate a synthetic domain loss and the refined version of the real image acquisition data to the real image acquisition data to calculate a real domain loss; and
updating network parameters of the cross-domain depth encoder and the synthetic conditional depth prediction branch network based on the synthetic domain loss and network parameters of the cross-domain depth encoder and the real conditional depth prediction branch network based on the real domain loss to iteratively train the domain adaptive refinement agent.

15. The method of claim 14, further comprising:
receiving the synthetic image acquisition data and the corresponding conditional synthetic image data; and
receiving the real image acquisition data and the corresponding conditional real image data.

16. The method of claim 15, wherein to generate the refined version of the synthetic image acquisition data conditioned on the conditional synthetic image data, the method further comprises:
encoding, by the synthetic encoder of the synthetic conditional depth decoder branch network, the conditional synthetic image data into the compact synthetic conditional depth feature representation; and
concatenating, by a synthetic concatenation element of the synthetic conditional depth decoder branch network, the compact synthetic feature representation from the cross-domain encoder with the compact synthetic conditional depth feature representation.

17. The method of claim 15, wherein to generate the refined version of the real image acquisition data conditioned on the conditional real image data, the method further comprises:
encoding, by the real encoder of the real conditional depth prediction branch network, the conditional real image data into a compact real conditional depth feature representation;
concatenating, by a real concatenation element of the real conditional depth prediction branch network, the compact real feature representation with the compact real conditional depth feature representation; and
decoding, by a real decoder of the real conditional depth prediction branch network, the compact real feature representation into the refined version of the real image acquisition.

18. The supervised learning-based method of claim 14, wherein the compact synthetic feature representation is decoded, by the synthetic decoder of the synthetic conditional depth decoder branch, to generate the refined version of the synthetic image acquisition data conditioned on the conditional synthetic depth feature, and wherein no skip links connect the cross-domain depth encoder with the synthetic decoder.

* * * * *

UNITED STATES PATENT AND TRADEMARK OFFICE
CERTIFICATE OF CORRECTION

PATENT NO. : 11,908,036 B2  
APPLICATION NO. : 17/034467  
DATED : February 20, 2024  
INVENTOR(S) : Oliver Wang et al.

Page 1 of 1

It is certified that error appears in the above-identified patent and that said Letters Patent is hereby corrected as shown below:

On the Title Page

Item (56) Under OTHER PUBLICATIONS:
• Page 2, Line 17, the word "preprinl" should read -- preprint --.

In the Claims

• Column 23, Line 14, "image data the" should read -- image data, the --.

Signed and Sealed this  
Third Day of September, 2024

Katherine Kelly Vidal  
*Director of the United States Patent and Trademark Office*